United States Patent
Lee et al.

(10) Patent No.: US 10,229,681 B2
(45) Date of Patent: Mar. 12, 2019

(54) VOICE COMMAND PROCESSING OF WAKEUP SIGNALS FROM FIRST AND SECOND DIRECTIONS

(71) Applicant: Samsung Electronics Co., Ltd., Gyeonggi-do (KR)

(72) Inventors: Yo Han Lee, Gyeonggi-do (KR); Jin Gil Yang, Suwon-si (KR); Jae Seok Joo, Gyeonggi-do (KR); Chi Hyun Cho, Gyeonggi-do (KR); Chang Ryong Heo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 58 days.

(21) Appl. No.: 15/411,140

(22) Filed: Jan. 20, 2017

(65) Prior Publication Data

US 2017/0206900 A1    Jul. 20, 2017

(30) Foreign Application Priority Data

Jan. 20, 2016    (KR) .................. 10-2016-0006908

(51) Int. Cl.
*G10L 15/22*    (2006.01)
*G10L 15/08*    (2006.01)
*H04R 1/40*    (2006.01)

(52) U.S. Cl.
CPC .............. *G10L 15/22* (2013.01); *G10L 15/08* (2013.01); *H04R 1/406* (2013.01); *G10L 2015/088* (2013.01); *G10L 2015/223* (2013.01)

(58) Field of Classification Search
CPC .............. G10L 15/22; G10L 2015/223; G10L 2015/225; G10L 2015/226; G10L 2015/227; G10L 15/24; G10L 15/28; G10L 15/285; G10L 17/06; B25J 13/003

USPC ....... 704/231, 236, 246, 251, 270, 272, 275; 700/245, 246, 247

See application file for complete search history.

(56) References Cited

U.S. PATENT DOCUMENTS

| 6,728,598 B2 * | 4/2004 | Fujita ................. G05B 19/0426 379/88.03 |
| 6,904,334 B2 * | 6/2005 | Asano .................... B25J 13/003 219/130.01 |
| 7,388,879 B2 * | 6/2008 | Sabe ....................... H04L 67/10 370/328 |

(Continued)

FOREIGN PATENT DOCUMENTS

KR    1020140047273    4/2014

*Primary Examiner* — Martin Lerner
(74) *Attorney, Agent, or Firm* — The Farrell Law Firm, P.C.

(57) ABSTRACT

An electronic robot device is provided which includes a body, a rotatable head physically connected with the body, a plurality of microphones arranged in the body or the head, a processor electrically connected with the plurality of microphones and configured to control rotation of the head, and a memory electrically connected with the processor, wherein the processor is configured to control the head to face a first direction in response to a first wakeup signal received from the first direction, if a second wakeup signal is received from a second direction while a first command received from the first direction is processed, store information on the second direction in the memory, if the first command is completely processed, control the head to face the second direction, and process a second command received from the second direction.

15 Claims, 12 Drawing Sheets

(56) References Cited

U.S. PATENT DOCUMENTS

| | | | |
|---|---|---|---|
| 7,894,941 B2* | 2/2011 | Ogawa | B25J 13/003 340/815.46 |
| 9,445,209 B2* | 9/2016 | Dadu | G06F 3/167 |
| 9,621,984 B1* | 4/2017 | Chu | H04R 1/406 |
| 9,734,845 B1* | 8/2017 | Liu | G10L 25/78 |
| 2002/0181723 A1* | 12/2002 | Kataoka | B25J 13/003 381/92 |
| 2003/0097202 A1* | 5/2003 | Fujita | G05B 19/0426 700/245 |
| 2003/0133577 A1* | 7/2003 | Yoshida | H04R 1/403 381/56 |
| 2003/0139851 A1* | 7/2003 | Nakadai | G10L 21/0208 700/258 |
| 2004/0015265 A1* | 1/2004 | Asano | B25J 13/003 700/245 |
| 2006/0004487 A1* | 1/2006 | Sugiyama | B60R 25/257 700/245 |
| 2008/0262849 A1* | 10/2008 | Buck | G10L 15/28 704/275 |
| 2008/0279391 A1* | 11/2008 | Yoshida | H04R 1/403 381/92 |
| 2011/0145000 A1* | 6/2011 | Hoepken | G10L 15/22 704/275 |
| 2011/0172822 A1* | 7/2011 | Ziegler | B25J 5/007 700/259 |
| 2013/0199570 A1* | 8/2013 | Lee | G05D 1/0234 134/18 |
| 2014/0249817 A1* | 9/2014 | Hart | G10L 15/22 704/254 |
| 2015/0379992 A1* | 12/2015 | Lee | G10L 15/22 704/275 |
| 2016/0274212 A1* | 9/2016 | Rump | G01S 3/8083 |
| 2016/0379121 A1* | 12/2016 | Ge | B25J 11/0005 706/46 |
| 2017/0091532 A1* | 3/2017 | Son | G06K 9/00268 |
| 2017/0187711 A1* | 6/2017 | Joo | G06F 21/32 |
| 2017/0205897 A1* | 7/2017 | Chun | G06F 3/03 |
| 2017/0368688 A1* | 12/2017 | Lin | G10L 25/48 |
| 2018/0130468 A1* | 5/2018 | Pogue | G10L 15/22 |

* cited by examiner

US 10,229,681 B2

VOICE COMMAND PROCESSING OF WAKEUP SIGNALS FROM FIRST AND SECOND DIRECTIONS

PRIORITY

This application claims priority under 35 U.S.C. § 119(a) to Korean Patent Application Serial No. 10-2016-0006908, which was filed on Jan. 20, 2016, in the Korean Intellectual Property Office, the entire disclosure of which is incorporated herein by reference.

BACKGROUND

1. Field of the Disclosure

The present disclosure generally relates to an electronic device, and more particularly, to a method of processing voice commands in an electronic device made by a plurality of users.

2. Description of the Related Art

Various types of electronic devices have been developed due to the development of electronic technologies. In particular, interest in an electronic robot device that may move or perform various functions in response to a command of a user has been increasing. The electronic robot device may detect a voice generated by a user and may perform a function corresponding to the detected voice.

The electronic robot device includes a plurality of microphones but may respond only to a command of one user at one time. Accordingly, while one of the plurality of users gives a command to the electronic robot device, the other users have to wait to use the electronic robot device.

SUMMARY

Aspects of the present disclosure are to address at least the above-mentioned problems and/or disadvantages and to provide at least the advantages described below. According to an aspect of the present disclosure, an electronic robot device is provided that may efficiently process voice signals of a plurality of users, which may be generated at the same time, and a method thereof.

In accordance with an aspect of the present disclosure, an electronic robot device is provided which includes a body, a rotatable head physically connected with the body, a plurality of microphones arranged in the body or the head, a processor electrically connected with the plurality of microphones and configured to control rotation of the head, and a memory electrically connected with the processor, wherein the processor is configured to control the head to face a first direction in response to a first wakeup signal received from the first direction, if a second wakeup signal is received from a second direction while a first command received from the first direction is processed, store information on the second direction in the memory, if the first command is completely processed, control the head to face the second direction, and process a second command received from the second direction.

In accordance with another aspect of the present disclosure, an electronic device is provided which includes a housing, an array of microphones exposed through at least a portion of the housing and arranged and configured to receive sounds from different directions, a speaker exposed through the housing, a volatile memory, a processor located within the housing, and electrically connected with the array of microphones, the speaker, and the volatile memory, and a nonvolatile memory electrically connected with the processor, wherein the nonvolatile memory stores instructions that, when executed, cause the processor to, receive a first voice command that triggers a first voice recognition using at least some of the array of microphones, perform at least a portion of the first voice recognition, store a result of the first voice recognition in the volatile memory, while performing the at least a portion of the first voice recognition, receive a second voice command that triggers a second voice recognition using the at least some of the array of microphones, determine a direction from which the second voice command is delivered, and perform at least a portion of the second voice recognition based on the determined direction.

In accordance with another aspect of the present disclosure, a voice command processing method of an electronic robot device that includes a body and a rotatable head physically connected with the body is provided, the method including controlling the head to face a first direction in response to a first wakeup signal received from the first direction, if a second wakeup signal is received from a second direction while a first command received from the first direction is processed, storing information on the second direction, if the first command is completely processed, controlling the head to face the second direction, and processing a second command received from the second direction.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
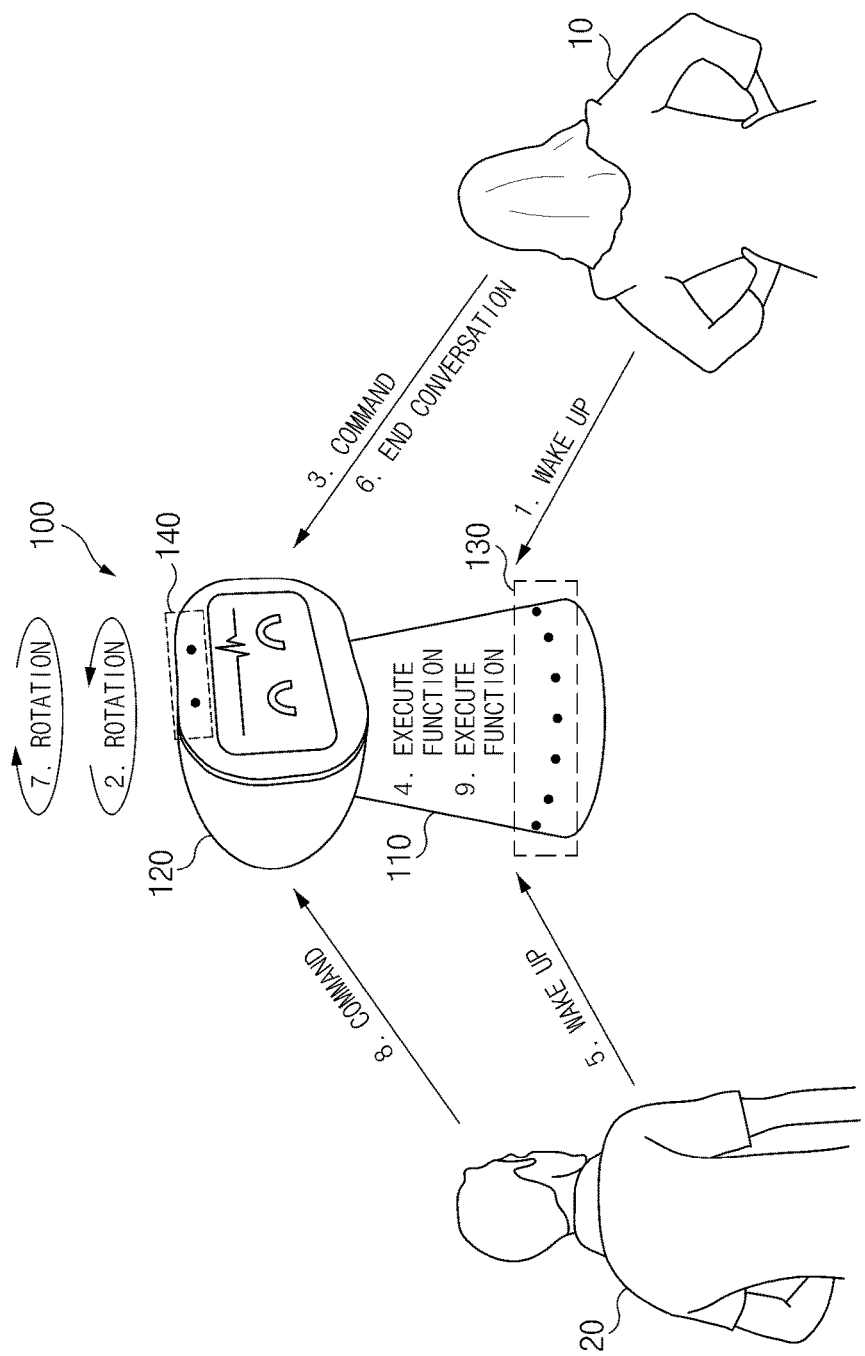
FIG. 1 illustrates an environment and a method of operation in which an electronic device is operated, according to an embodiment of the present disclosure.

Hereinafter, various embodiments will be described with reference to the accompanying drawings. Accordingly, those of ordinary skill in the art will recognize that modifications, equivalents, and/or alternatives on the various embodiments described herein may be made without departing from the scope and spirit of the present disclosure.

In the present disclosure, the expressions "have", "may have", "include" and "comprise", or "may include" and "may comprise" as used herein, indicate the existence of corresponding features (for example, elements such as numeric values, functions, operations, or components) but do not exclude the presence of additional features.

In the present disclosure, the expressions "A or B", "at least one of A or/and B", or "one or more of A or/and B", and the like, as used herein may include any and all combinations of one or more of the associated listed items. For example, the terms "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like as used herein may refer to various elements of various embodiments, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being operatively or communicatively coupled with/to or "connected to" another element (for example, a second element), it may be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening elements (for example, a third element).

According to the situation, the expression "configured to" as used herein may be used interchangeably with the expressions "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to perform A, B, and C" may mean a dedicated processor (for example, an embedded processor) for performing a corresponding operation or a general-purpose processor (for example, a central processing unit (CPU) or an application processor) which may perform corresponding operations by executing one or more software programs which are stored in a memory device.

The terms used in this specification are used to describe embodiments of the present disclosure and do not limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. The terms defined in a generally used dictionary should be interpreted as having the same or similar meanings as the contextual meanings of the relevant technology and should not be interpreted as having ideal or exaggerated meanings unless they are clearly defined herein. In some cases, even if terms are defined in the specification, they may not be interpreted to exclude embodiments of the present disclosure.

An electronic device, according to an embodiment of the present disclosure, may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. The wearable devices may include accessories (for example, watches, rings, bracelets, ankle bracelets, eyeglasses, contact lenses, or head-mounted devices (HMDs)), clothing-integrated types (for example, electronic clothes), body-attached types (for example, skin pads or tattoos), or implantable types (for example, implantable circuits).

The electronic device may be one of home appliances. The home appliances may include, for example, at least one of a digital video disk (DVD) player, an audio player, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

According to an embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MM) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller machine (ATM), a point of sales (POS) terminal, or an Internet of things (IoT) device (for example, a light bulb, various sensors, an electricity or gas meter, a spring cooler device, a fire alarm device, a thermostat, an electric pole, a toaster, a sporting apparatus, a hot water tank, a heater, and a boiler).

According to an embodiment of the present disclosure, the electronic device may include at least one of furniture or a part of a building/structure, an electronic board, an electronic signature receiving device, a projector, or various measurement devices (for example, a water service, electricity, gas, or electric wave measuring device). The electronic device may be one or a combination of the aforementioned devices. The electronic device may be a flexible electronic device. Further, the electronic device is not limited to the aforementioned devices, but may include new electronic devices produced due to the development of new technologies.

Hereinafter, electronic devices, according to an embodiment of the present disclosure, will be described with reference to the accompanying drawings. The term "user" as used herein may refer to a person who uses an electronic device or may refer to a device (for example, an artificial intelligence electronic device) that uses an electronic device.

FIG. 1 illustrates an environment and a method of operation in which an electronic device is operated, according to an embodiment of the present disclosure.

Referring to FIG. 1, the electronic device 100 may be an electronic robot device such as a home robot. The electronic device 100 may include a housing, and includes a body 110, a head 120, a first array of microphones 130, and a second array of microphones 140.

The body 110 may have a form in which the electronic device 100 is positioned on the ground surface. For example, the body 110 may have a cylindrical or conical shape. The body 110 may include a circumferential array of microphones. The head 120 may be physically connected with the body 110. The head 120 may be connected with the body 110 by a rotor, of which rotation may be controlled by the electronic device 100. The head 120 may be rotated. For example, the head 120 may be rotated about an axis along which the head 120 is connected with the body 110. The head 120 may include an array of microphones and a display on a front surface (for example a surface that faces a user when a command is received). The circuits of the electronic device 100, such as a processor and a memory, may be provided in the body 110 or the head 120.

The electronic device 100 may include a first array of microphones 130 and a second array of microphones 140, which are exposed through at least portions of the housing. The first array of microphones 130 and the second array of microphones 140 may be arranged in the body 110 or the head 120, respectively. For example, the first array of microphones 130 may be arranged on a side wall of the body 110. The first array of microphones 130 may be arranged and configured to receive a sound from different directions. The first array of microphones 130 may be non-directional microphones. The second array of microphones 140 may be arranged on a front surface of the head 120. The second array of microphones 140 may be arranged and configured to receive a sound from a direction, which the head 120 faces. The second array of microphones 140 may be directional microphones.

Referring to FIG. 1, the electronic device 100 receives a wakeup signal that triggers a voice recognition of the electronic device 100, from a first user 10 in operation 1. The electronic device 100 may receive a wakeup signal from the first user 10, by using the first array of microphones 130 arranged in the body 110. The electronic device 100 may determine a direction from which a wakeup signal is received from the first user 10. The electronic device 100 rotates the head 120 to a direction from which the wakeup signal is received in operation 2. The electronic device 100 may execute a response to the first user 10 after the head 120 is rotated. The electronic device 100 may receive a command from the first user 10 in operation 3. The electronic device 100 may receive a command by using a microphone that faces the first user 10. For example, the electronic device 100 may receive a command by using the second array of microphones 140 that is arranged in the head 120 that faces the first user 10. The electronic device 100 may execute a function corresponding to a command received from the first user 10 in operation 4.

While a command is received from the first user 10 or a function corresponding to the received command is executed, the electronic device 100 may receive a wakeup signal from the second user 20 by using the first array of microphones 130 in operation 5. The electronic device 100 may store information on the direction from which the wakeup signal is received, from the second user 20. If a conversation with the first user 10 has ended in operation 6, the electronic device 100 rotates the head 120 to the direction from which the wakeup signal is received from the second user 20, based on the stored information in operation 7. The electronic device 100 may execute a response to the second user 20 after the head 120 is rotated. The electronic device 100 receives a command from the second user 20 in operation 8. The electronic device 100 may receive a command by using the second array of microphones 140 arranged in the head 120 that faces the second user 20. The electronic device 100 executes a function corresponding to the command received from the second user 20 in operation 9.

The electronic device 100, according to an embodiment of the present disclosure, may store the reception direction of the wakeup signal generated by the second user 20 to process commands that are generated concurrently by a plurality of users, while receiving the command of the first user 10 and executing a function corresponding to the command.

Figure 2:
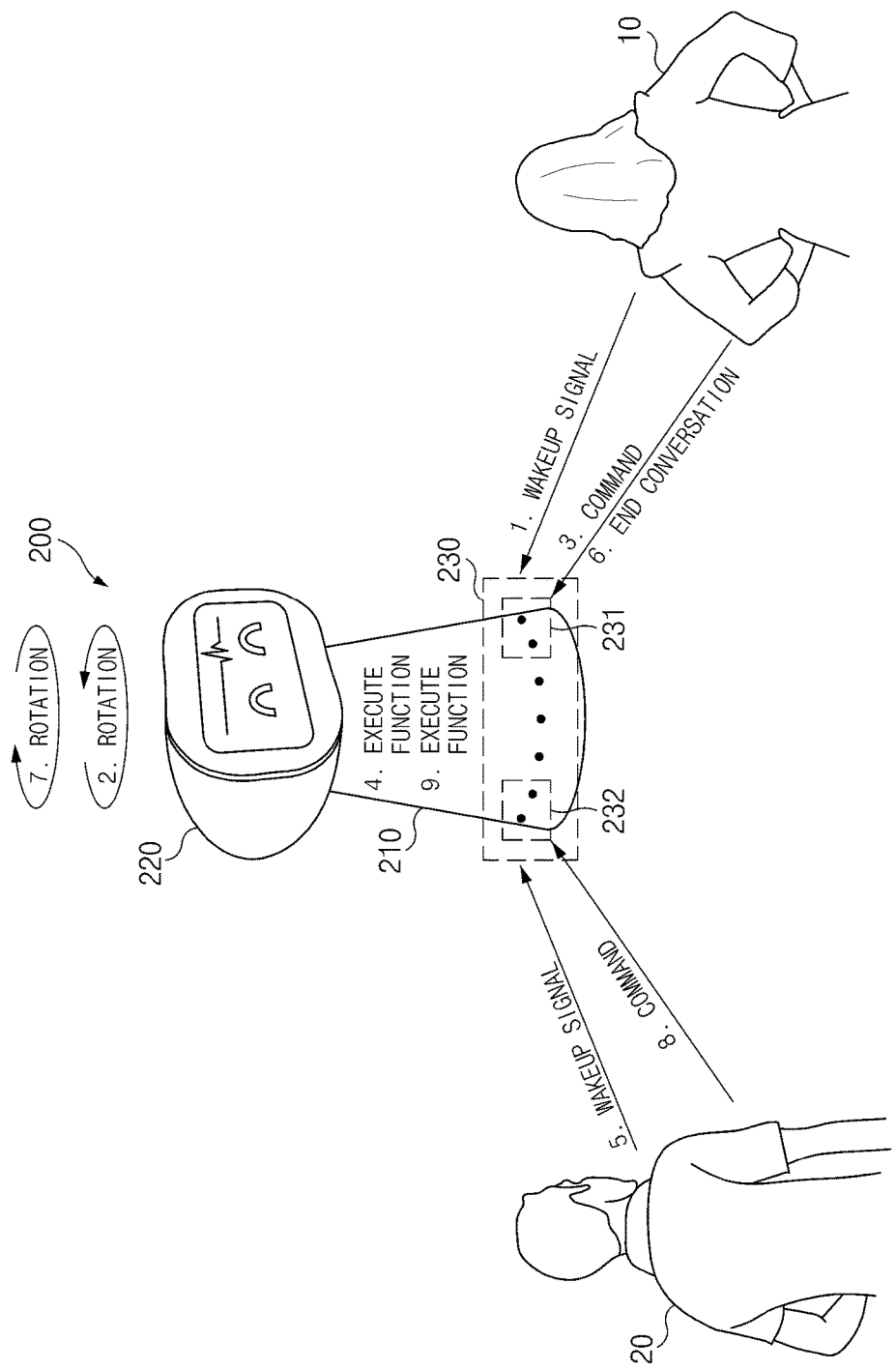
FIG. 2 illustrates an environment and a method of operation in which an electronic device is operated, according to an embodiment of the present disclosure.

FIG. 2 illustrates an environment and a method of operation in which an electronic device is operated, according to an embodiment of the present disclosure.

Referring to FIG. 2, the electronic device 200 may include a housing, and includes a body 210, a head 220, and an array of microphones 230.

The electronic device 200 includes an array of microphones 230 that is exposed through at least a portion of the housing. The array of microphones 230 may be arranged on a side wall of the body 210. The array of microphones 230 may be arranged and configured to receive a sound from different directions. The array of microphones 230 may be non-directional microphones.

The electronic device 200 receives a wakeup signal that triggers a voice recognition of the electronic device 200, from a first user 10 in operation 1. The electronic device 200 may receive a wakeup signal from the first user 10, by using the array of microphones 230. The electronic device 200 may determine a direction from which a wakeup signal is received by the first user 10. The electronic device 200 rotates the head 220 in a direction from which the wakeup signal is received in operation 2. The electronic device 200 receives a command from the first user 10 in operation 3. The electronic device 200 may receive a command by using a microphone 231, which faces a first user 10, of a plurality of microphones provided in the array of microphones 230. The electronic device 200 may select a microphone 232 based on a direction from which a wakeup signal is received by the first user 10. The electronic device 200 executes a function corresponding to a command received from the first user 10 in operation 4.

While a command is received from the first user 10 or a function corresponding to the received command is executed, the electronic device 200 receives a wakeup signal from the second user 20 by using the array of microphones 230 in operation 5. The electronic device 200 may store information on the direction from which the wakeup signal is received, from the second user 20. If a conversation with the first user 10 has ended in operation 6, the electronic device 200 rotates the head 220 in the direction from which the wakeup signal is received from the second user 20, based on the stored information in operation 7. The electronic device 200 receives a command from the second user 20 in operation 8. The electronic device 200 may receive a command by using the microphone 232, which faces the second user 20, of a plurality of microphones provided in the array of microphones 232. The electronic device 200 may select the microphone 232 based on the stored information. The electronic device 200 executes a function corresponding to the command received from the second user 20 in operation 9.

The electronic device 200, according to an embodiment of the present disclosure, may store the reception direction of the wakeup signal and receive a command from the user by using a microphone arranged towards the reception direction to process commands that are concurrently generated by a plurality of users, by using one microphone array 230.

Figure 3:
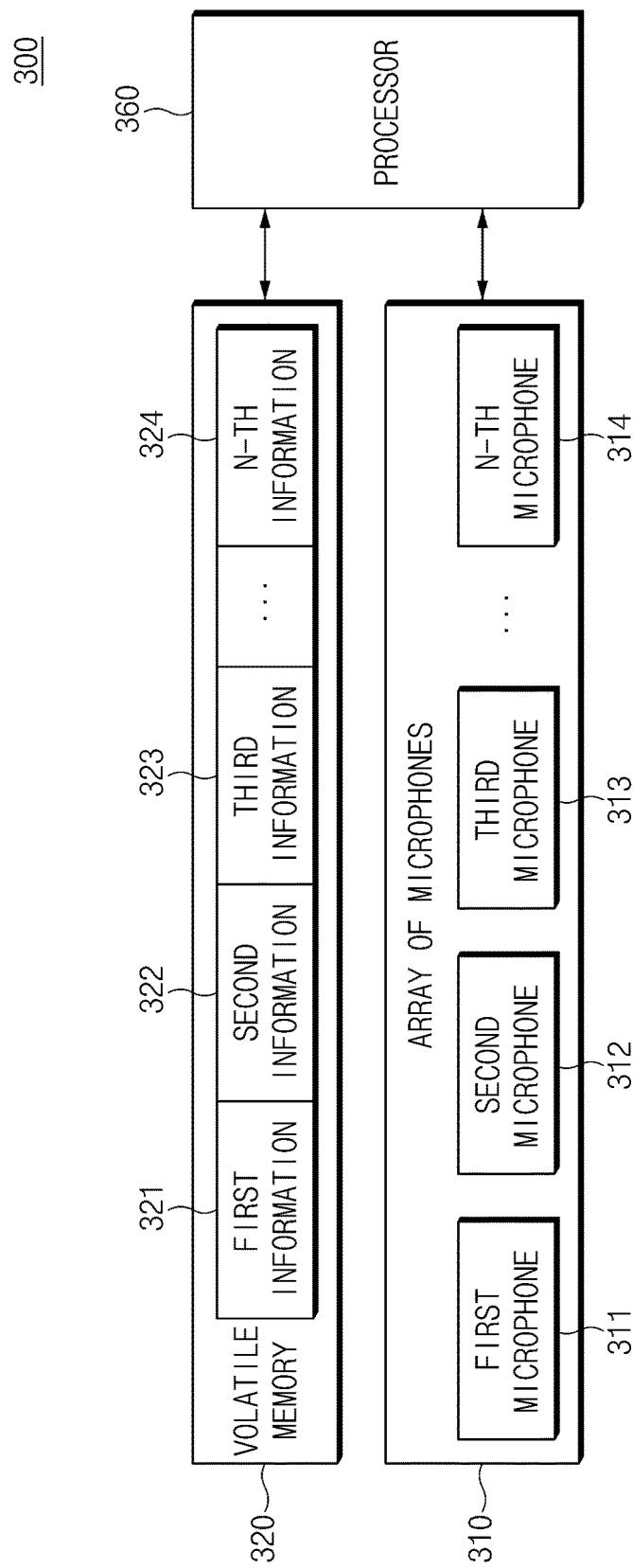
FIG. 3 is a block diagram of an electronic device, according to an embodiment of the present disclosure.

FIG. 3 is a block diagram of an electronic device, according to an embodiment of the present disclosure.

Referring to FIG. 3, the electronic device 300 includes an array of microphones 310, a volatile memory 320, and a processor 360. The electronic device may be the electronic device 200 of FIG. 2.

The array of microphones 310 (for example, 230 of FIG. 2) may include a plurality of microphones 311, 312, 313 and 314. The plurality of microphones 311, 312, 313 and 314 may be arranged along a direction which the head of the electronic device may face. The plurality of microphones 311, 312, 313 and 314 may be arranged to face a user who inputs a command to the electronic device at a specific location. The plurality of microphones 311, 312, 313 and 314, for example, may be arranged to surround a side wall of the electronic device. The plurality of microphones 311, 312, 313 and 314 may be non-directional microphones.

The volatile memory 320 may store information on a direction in which a wakeup signal has been received from the user. The volatile memory 320 may store information in a first-in first-out (FIFO) scheme. For example, when a first information 321, a second information 322, a third information 323, and an n-th information 324 are sequentially stored in the volatile memory 320, the processor 360 may sequentially perform processing related to the first information 321, the second information 322, the third information 323, and the n-th information 324 respectively. As another example, if wakeup signals are received from a plurality of users, the volatile memory 320 may store information on directions in the reception sequence of the wakeup signals.

The processor 360 may be electrically connected with the array of microphones 310 and the volatile memory 320. The processor 360 may control the array of microphones 310 and the volatile memory 320. The processor 360 may control rotation of the head (for example, head 120 of FIG. 1 or head 220 of FIG. 2) of the electronic device.

According to an embodiment of the present disclosure, the processor 360 may control the head to face a first direction in response to a first wakeup signal (or a first voice command) that is received from the first direction.

The processor 360 may detect a sound wave (for example, a voice generated by the first user) from a periphery by using a plurality of microphones 311, 312, 313, and 314.

The processor 360 may determine whether the detected sound wave corresponds to a wakeup signal. The wakeup signal, for example, may include various voice signals, such as a voice signal including a specific word, a voice signal including a combination of words including a specific word, a voice signal of a specific type (for example, a specific sentence type (or pattern)), a voice signal related to a specific domain, or a voice signal of a specific user. For example, the processor 360 may determine that a wakeup signal has been received when the detected sound wave is similar to a specific waveform. According to an embodiment of the present disclosure, the processor 360 may perform a voice recognition for the detected sound wave, and may determine that the wakeup signal has been received when a specific word is included in the voice recognition result.

If the sound wave corresponds to a wakeup signal, the processor 360 may obtain information on a first direction of the wakeup signal based on at least one of a detection time or a waveform of the wakeup signal. For example, the processor 360 may obtain a direction in which the wakeup signal is generated (or a point at which the wakeup signal is generated) based on a difference between times at which the sound waves are detected by the plurality of microphones 311, 312, 313 and 314. As another example, the processor 360 may obtain a direction in which the wakeup signal is generated, based on the amplitudes and/or phases of the sound waves detected by the plurality of microphones 311, 312, 313 and 314.

The processor 360 may rotate the head such that the head faces the direction in which the wakeup signal is generated, based on the information on the direction.

According to an embodiment of the present disclosure, if the head is rotated to the first direction, the processor 360 may receive a first command that is generated by the first user by using a microphone, which has been selected based on the information on the first direction, of the plurality of microphones. The processor 360 may receive a first command by using a microphone which is arranged in the first direction, of the plurality of microphones 311, 312, 313 and 314. For example, when the first microphone 311 and the second microphone 312 are arranged in the first direction, the first command may be received by the first microphone 311 and the second microphone 312. The processor 360 may execute a specific function corresponding to the first command.

According to an embodiment of the present disclosure, the processor 360 may amplify a signal received from the first direction by using two or more of the plurality of microphones. For example, the processor 360 may amplify a signal received from the first direction, by using the first microphone 311 and the second microphone 312, which are arranged in the first direction, of the plurality of microphones 311, 312, 313 and 314. When a signal is detected by using the first microphone 311 and the second microphone 312, a signal received from the first direction may reach the first microphone 311 and the second microphone 312 at the same time, and a signal received from another direction may arrive at a different time. In this case, the processor 360 may amplify a signal received from the first direction by mixing the received signal. The processor 360, for example, may amplify a signal received from a specific direction, by using a beam forming algorithm by a technique such as a minimum variance distortionless response (MVDR) or a linearly constrained minimum variance (LCMV).

According to an embodiment of the present disclosure, the processor 360 may store information on a second direction in the volatile memory 320 if receiving a second wakeup signal (or a second voice command) from the second direction while processing the first command received from the first direction. First, the processor 360 may process a command received from the second user after the information on the second direction is stored, when the second user located in the second direction uses the electronic device while the first user located in the first direction uses the electronic device.

According to an embodiment of the present disclosure, the processor 360 may store information on directions in the volatile memory 320 in a FIFO scheme. For example, if receiving a third wakeup signal from a third direction while processing the first command after the information on the second direction is stored in the volatile memory 320, the processor 360 may store information on the third direction in the volatile memory 320. Thereafter, the processor 360 may receive the third command from the third direction after receiving the second command from the second direction.

According to an embodiment of the present disclosure, the processor 360 may process the second command received from the second direction while controlling the head to face the second direction, if the first command is completely processed.

For example, if receiving a stop command from the first direction or not receiving a command from the first direction for a specific time period, the processor 360 may determine that the first command has been completely processed. As another example, the processor 360 may detect a motion of the first user located in the first direction by using a camera provided in the electronic device 300, and may determine that the first command has been completely processed if the first user moves outside of a specific area.

The processor 360 may identify information on the second direction stored in the volatile memory 320 if the first command has been completely processed. When the information on the second direction is stored, the processor 360 may rotate the head such that the head faces the second direction. If the head is rotated to the second direction, the processor 360 may process the second command received from the second direction. The processor 360 may execute a specific function corresponding to the second command.

According to an embodiment of the present disclosure, while processing the second command, the processor 360 may receive a second command by using a microphone, which has been selected based on the information on the second direction, of the plurality of microphones. The processor 360 may receive a second command by using a microphone which is arranged in the second direction, of the plurality of microphones 311, 312, 313 and 314. For example, when the third microphone 313 is arranged in the second direction, the processor 360 may receive the second command by using the third microphone 313.

According to an embodiment of the present disclosure, while processing the second command, the processor 360 may amplify a signal received from the second direction by using two or more of the plurality of microphones. The processor 360 may amplify a signal received from the second direction, by using two or more microphones arranged in the second direction. The processor 360, for example, may amplify a signal received from a specific direction by using a beam forming algorithm by a technique such as an MVDR or an LCMV.

According to an embodiment of the present disclosure, when information on a plurality of directions are stored in the volatile memory 320, the processor 360 may control the head in the sequence in which the information is stored. When the information on the second direction and the information on the third direction are stored in the volatile memory 320 during processing of the first command, the processor 360 may sequentially perform responses to the second direction and the third direction. For example, the processor 360 may control the head to face the second direction and process the second command received from the second direction if the first command has been completely processed, and may control the head to face the third direction and process the third command received from the third direction if the second command has been completely processed.

According to an embodiment of the present disclosure, the processor 360 may recognize a speaker of a command received from the first direction while processing the command, and may control the head to face the second direction if receiving a command of the same speaker from the second direction. For example, the processor 360 may receive a command from the first speaker located in the first direction to process the command. The processor 360 may recognize the first speaker, and may store the information on the first speaker in the volatile memory 320. The first speaker may move while making a command towards the electronic device. In this case, the processor 360 may receive the command of the first speaker from the second direction before the command received from the first speaker is completely processed. The processor 360 may determine a speaker of a command received from the second direction. If the speaker of the command received from the second direction is the first speaker, the processor 360 may immediately rotate the head to the second direction. The processor 360 may process the command of the first speaker received from the second direction.

Figure 4:
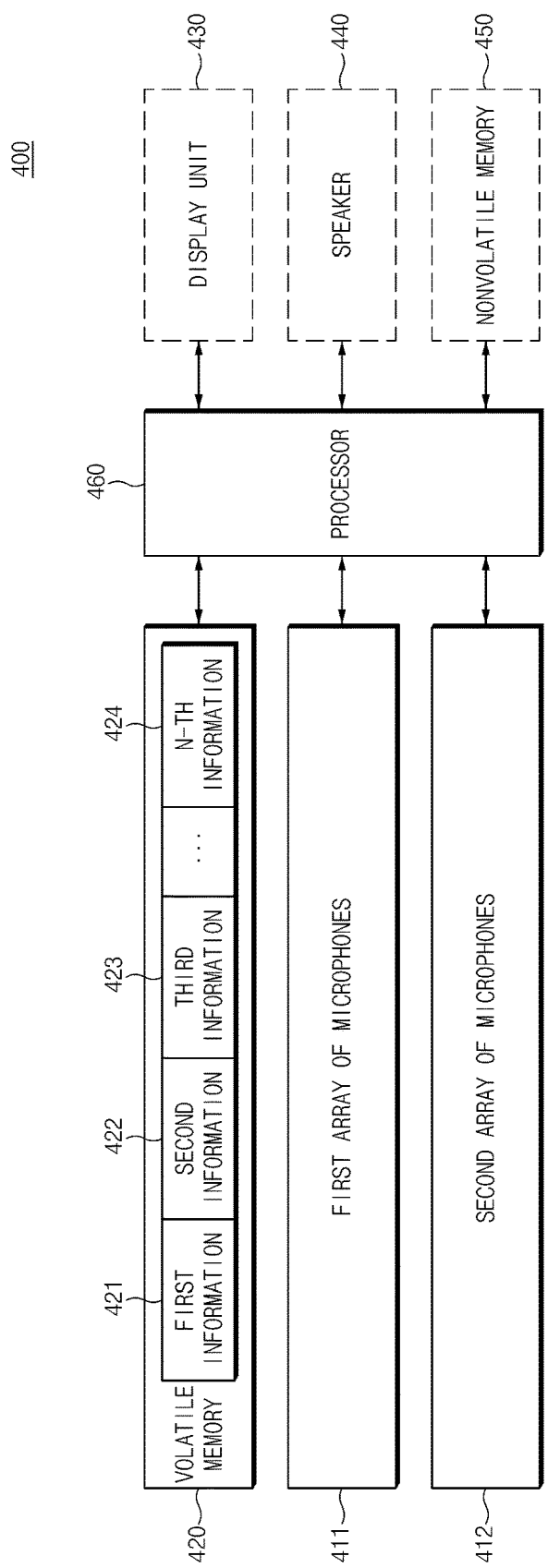
FIG. 4 is a block diagram illustrating a configuration of an electronic device, according to an embodiment of the present disclosure.

FIG. 4 is a block diagram illustrating a configuration of an electronic device, according to an embodiment of the present disclosure.

Referring to FIG. 4, the electronic device includes a first array of microphones 411, a second array of microphones 412, a volatile memory 420, a display unit 430, a speaker 440, and a nonvolatile memory 450.

The first array of microphones 411 may include a plurality of microphones. The first array of microphones 411 may be arranged to surround a side wall of the electronic device. For example, the first array of microphones 411 may be arranged on a side wall of a body of the electronic device. The plurality of microphones provided in the first array of microphones 411 may be non-directional microphones.

The second array of microphones 412 may include one or more microphones. The second array of microphones 412 may be arranged to face a front direction of the head of the electronic device. For example, the second array of microphones 412 may be arranged on a front surface of the head of the electronic device. The second array of microphones 412 may be directional microphones.

The volatile memory 420 may store information on a direction in which a wakeup signal has been received from the user. The volatile memory 420 may have a configuration that is the same as that of the volatile memory 320 of FIG. 3.

The display unit 430 may be arranged to surround a side wall of the body of the electronic device. For example, the display unit 430 may include a plurality of light emitting diodes (LEDs) arranged along a side wall of the electronic device. As another example, the display unit 430 may include a display panel arranged to surround the side wall of the electronic device. The display unit 430 may output an indication that indicates a state of progress of a sound command (or a wakeup signal) and a voice recognition (or a command).

The speaker 440 may be exposed through the housing of the electronic device. The speaker 440, for example, may output a sound in response to a voice command or a voice recognition.

The nonvolatile memory 450 may store instructions that cause the processor 460 to perform operations, which will be described in the following, when the instructions are executed.

The processor 460 may be electrically connected with the first array of microphones 411, the second array of microphones 412, the volatile memory 420, the display unit 430, the speaker 440, and the nonvolatile memory 450. The processor 460 may control the first array of microphones 411, the second array of microphones 412, the volatile memory 420, the display unit 430, the speaker 440, and the nonvolatile memory 450. The processor 460 may perform a function that is the same as that of the processor 460 of FIG. 3.

According to an embodiment of the present disclosure, the processor 460 may receive a first voice command (or the first wakeup signal) that triggers a first voice recognition. The processor 460 may receive or detect the first voice command by using the first array of microphones 411 arranged in the body. The first voice command, for example, may be a voice including a specific message, such as "wakeup".

According to an embodiment of the present disclosure, if a first voice command is received, the processor 460 may perform a first voice recognition. The processor 460 may perform the first voice recognition by using the second array of microphones 412 arranged in the head. For example, the processor 460 may control rotation of the head such that the second array of microphones 412 faces the direction from which the first voice command is received. The processor 460 may perform a voice recognition for a sound wave detected by the second array of microphones 412.

According to an embodiment of the present disclosure, the processor 460 may temporarily store a result for the first voice recognition, in the volatile memory 420. The processor 460 may execute a function corresponding to the first voice recognition.

According to an embodiment of the present disclosure, while the first voice recognition is performed, the processor 460 may receive a second voice command (or a second wakeup signal) that triggers a second voice recognition, by using at least one of the array of microphones. The processor 460 may receive or detect the second voice command by using the first array of microphones 411 arranged in the body. The second voice command, for example, may correspond to a voice including the same message as the first voice command, and may correspond to a voice including a message that is different from the first voice command.

According to an embodiment of the present disclosure, the processor 460 may determine a direction from which the second voice command has been delivered. The processor 460, for example, may determine a direction, from which the second voice command has been delivered, based on a difference between times at which the second voice command is detected by the plurality of microphones provided in the first array of microphones 411. As another example, the processor 460 may determine a direction, from which the second voice command has been delivered, based on the amplitude or phase of the second voice command detected by the plurality of microphones provided in the first array of microphones 411.

According to an embodiment of the present disclosure, the processor 460 may perform a second voice recognition by using the determined direction. The processor 460 may store the information on the determined direction in the volatile memory 420. The processor 460 may identify information on the determined direction stored in the volatile memory 420 if the first voice recognition has been completed. When the information on the direction is stored in the volatile memory 420, the processor 460 may control rotation of the head such that the second array of microphones 412 faces the determined direction, based on the stored information. The processor 460 may perform a second voice recognition by using some of the plurality of microphones, which are arranged in the determined direction. For example, the processor 460 may perform the second voice recognition by using the second array of microphones 412, which faces the determined direction. The processor 460 may execute a function corresponding to the second voice recognition.

According to an embodiment of the present disclosure, if the second voice command is received while at least a portion of the first voice recognition is performed, the processor 460 may output an indication of a state of progress of the second command towards the determined direction, by using the display unit 430. An embodiment of using the display unit 430 will be described below in detail with reference to FIG. 5.

Figure 5A:
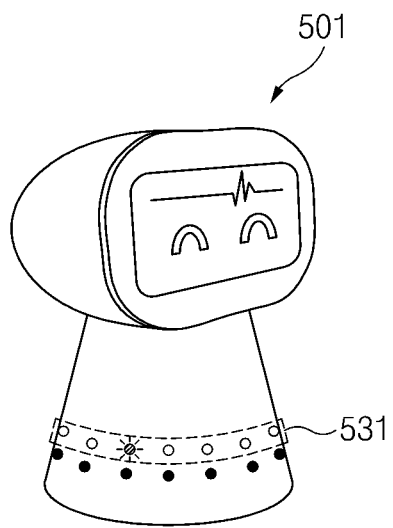
FIG. 5 illustrates a display unit provided in an electronic device, according to an embodiment of the present disclosure.
Figure 5B:
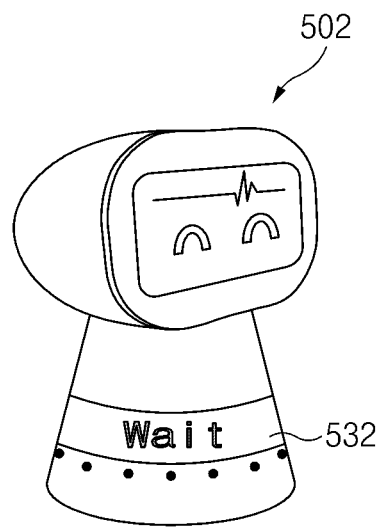

FIGS. 5A and 5B illustrate a display unit provided in an electronic device, according to an embodiment of the present disclosure.

Referring to FIG. 5A, the electronic device 501 includes a display unit 531. The display unit 531 may include a plurality of LEDs. The plurality of LEDs may be arranged to surround the electronic device 501 along the side wall of the electronic device 501. As illustrated in FIG. 5A, the plurality of LEDs may be arranged at locations corresponding to the plurality of microphones provided in the array of microphones.

If receiving a wakeup signal or a command (such as a voice command) from the user, the electronic device 501 may determine a direction in which the user makes the wakeup signal or the command. The electronic device 501 may indicate a state of progress of the wakeup signal or the command by using the LEDs, which are located in a direction of the wakeup signal or the command, of a plurality of LEDs. For example, the electronic device 501 may turn on a blue LED when reception of the wakeup signal or the command is successful, may turn on a red LED when the reception of the wakeup signal or the command fails, and may turn on a yellow LED when another user uses the electronic device 501.

Referring to FIG. 5B, the electronic device 502 includes a display unit 532. The display unit 532 may include a display panel. The display panel may be arranged to surround the electronic device 502.

If receiving a wakeup signal or a command from the user, the electronic device 502 may determine a direction in which the user makes the wakeup signal or the command. The electronic device 502 may output an indication that indicates a state of progress of the wakeup signal or the command in a direction in which the wakeup signal or the command is generated, by using the display unit 532. For example, the electronic device 502 may output a text of "OK" in a direction in which the user made the wakeup signal or the command when the reception of the wakeup signal or the command is successful, may output a text of "Failed" when the reception of the wakeup signal or the command fails, and may output a text of "Wait" when another user uses the electronic device 502.

The electronic device, according to an embodiment of the present disclosure, may display whether the second user's wakeup signal or command is recognized while the first user uses the electronic device by outputting an indication that indicates a state of progress. Further, the electronic device may provide an indication to a plurality of users who make wakeup signals or commands from various directions by outputting an indication in directions in which the users made the wakeup signals or commands.

Figure 6:
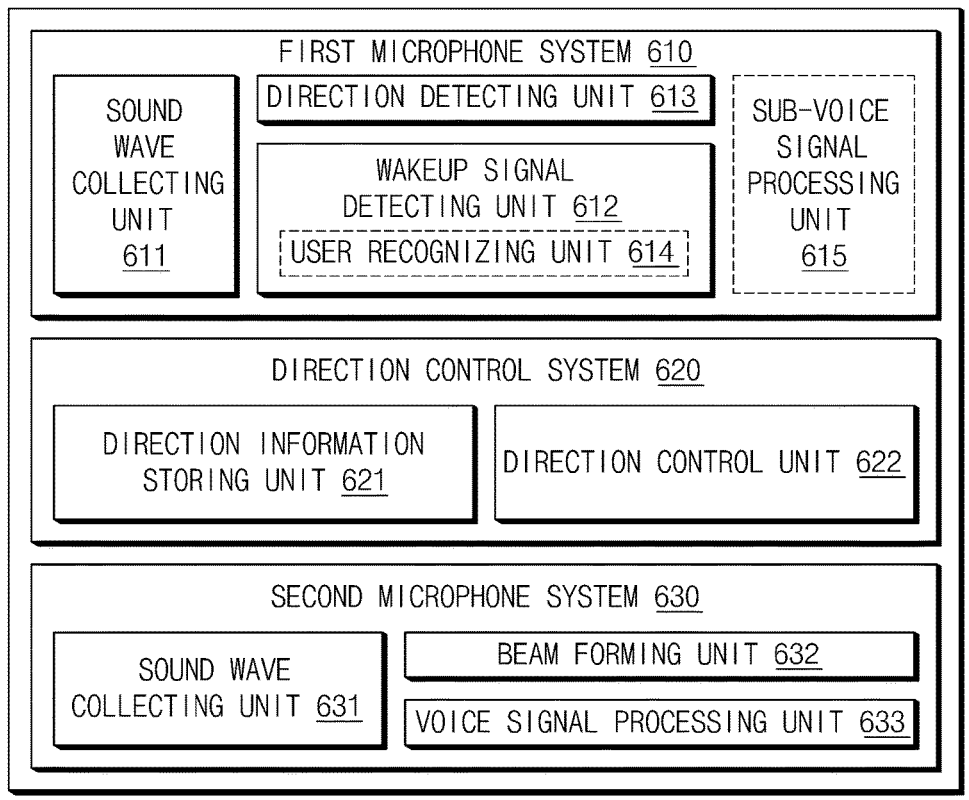
FIG. 6 is a block diagram of a program module stored in an electronic device, according to an embodiment of the present disclosure.

FIG. 6 is a block diagram of a program module stored in an electronic device, according to an embodiment of the present disclosure.

Referring to FIG. 6, the program module 600 includes a first microphone system 610, a direction control system 620, and a second microphone system 630.

The first microphone system 610 includes a sound wave collecting unit 611, a wakeup signal detecting unit 612, a direction detecting unit 613, a user recognizing unit 614, and a sub-voice signal processing unit 615. The first microphone system 610 may receive a wakeup signal and determine a reception direction of the wakeup signal. The first microphone system 610 may receive a wakeup signal that may be generated by a user even after receiving a wakeup signal from a user.

The sound wave collecting unit 611 may collect sound waves from a periphery of the electronic device by using a plurality of microphones. The sound wave collecting unit 611 may collect a sound wave by using a specific microphone (for example, the first array of microphones 411 of FIG. 4) of the plurality of microphones provided in the electronic device, and may collect a sound wave by using an arbitrary microphone (for example, the array of microphones 310 of FIG. 3) of the plurality of microphones.

The wakeup signal detecting unit 612 may detect a wakeup signal by analyzing the collected sound wave. The wakeup signal detecting unit 612, for example, may perform a voice recognition for the sound wave, and may determine that the wakeup signal is detected when a specific message is included in the sound wave.

When the wakeup signal is detected, the direction detecting unit 613 may detect a direction in which the wakeup signal is generated, based on a detection time and a waveform of the wakeup signal.

According to an embodiment of the present disclosure, the user recognizing unit 614 may recognize a speaker of the wakeup signal. The user recognizing unit 614 may recognize the speaker by comparing the waveform of the wakeup signal and a waveform stored in advance. The user recognizing unit 614 may store information on the speaker of the wakeup signal together with information on the direction in which the wakeup signal is generated if receiving the wakeup signal.

According to an embodiment of the present disclosure, if receiving a specific command that may be processed immediately from the second user during a response to a first user, the sub-voice signal processing unit 615 may process a command by the second user before a command by the first user is completely processed. For example, when receiving a command from the first user or receiving a light-out command from the second user while the received command is processed, the sub-voice signal processing unit 615 may turn off a light that may be controlled by the electronic device. When the electronic device is a home robot, the specific command, for example, may include a light-out command, a lighting command, a cooling command, a heating command, or a window opening/closing command, which may be processed by the electronic device. The electronic device may not perform an operation of detecting and storing a direction for the command processed by the sub-voice signal processing unit 615.

The direction control system 620 may include a direction information storing unit 621 and a direction control unit 622. The direction control system 620 may store information on a direction in which the wakeup signal is generated, and may control the head of the electronic device based on the information on the direction.

The direction information storing unit 621 may store information on the detected direction. The direction information storing unit 621 may store information on detected directions in the sequence in which the wakeup signals are received. The direction that indicates information on the direction of the generated wakeup signal may be different from the direction of the generated wakeup signal. For example, when the head of the electronic device may be controlled in units of 10° and the generated direction is spaced apart from a reference axis by 44°, the direction indicated by the information on the direction of the generated wakeup signal may be spaced apart from the reference axis by 40°. According to an embodiment of the present disclosure, the direction information storing unit 621 may change the storage sequence of the information on the generated wakeup signals based on the speakers of the wakeup signals.

The direction control unit 622 may control the head of the electronic device based on information on the direction of the generated wakeup signal. The direction control unit 622 may rotate the head such that the front direction of the head faces the direction of the generated wakeup signal. The direction control unit 622 may rotate the head in the sequence in which the direction information is stored by the direction information storing unit 621. For example, when the information on the first direction and the information on the second direction are sequentially stored, the direction control unit 622 may rotate the head to the second direction after rotating the head to the first direction.

According to an embodiment of the present disclosure, the direction control unit 622 may rotate the head by changing the sequence based on the speakers of the wakeup signals. For example, the priority of the speaker of the second wakeup signal (or the second command) is higher than the priority of the speaker of the first wakeup signal (or the first command) even though the first wakeup signal (or the first command) is generated before the second wakeup signal (or the second command), the direction control unit 622 may control the head to face the second direction, process the second command received from the second direction, control the head to face the first direction and process the first command received from the first direction if the second command is completely processed.

The second microphone system 630 includes a sound wave collecting unit 631, a beam forming unit 632, and a voice signal processing unit 633. The second microphone system 630 may receive a voice from a user, amplify the received voice, and perform a voice recognition after the head of the electronic device is controlled. The second microphone system 630 may select the voice received from a direction in which the head faces, and may process the selected voice.

The sound wave collecting unit 631 may collect sound waves by using a plurality of microphones. The sound wave collecting unit 631 may collect a sound wave by using a specific microphone (for example, the second array of microphones 412 of FIG. 4) of the plurality of microphones provided in the electronic device, and may collect sound waves by using a microphone (for example, the array of microphones 310 of FIG. 3), which is arranged in the direction in which the sound waves are generated, of the plurality of microphones.

The beam forming unit 632 may amplify the collected sound waves. For example, the beam forming unit 632 may selectively amplify the sound waves that have been collected from a direction in which the wakeup signal is generated or a direction which the head of the electronic device faces.

The voice signal processing unit 633 may perform a voice recognition based on the amplified sound waves. The voice signal processing unit 633 may execute a function corresponding to the result of the voice recognition after performing the voice recognition.

Figure 7:
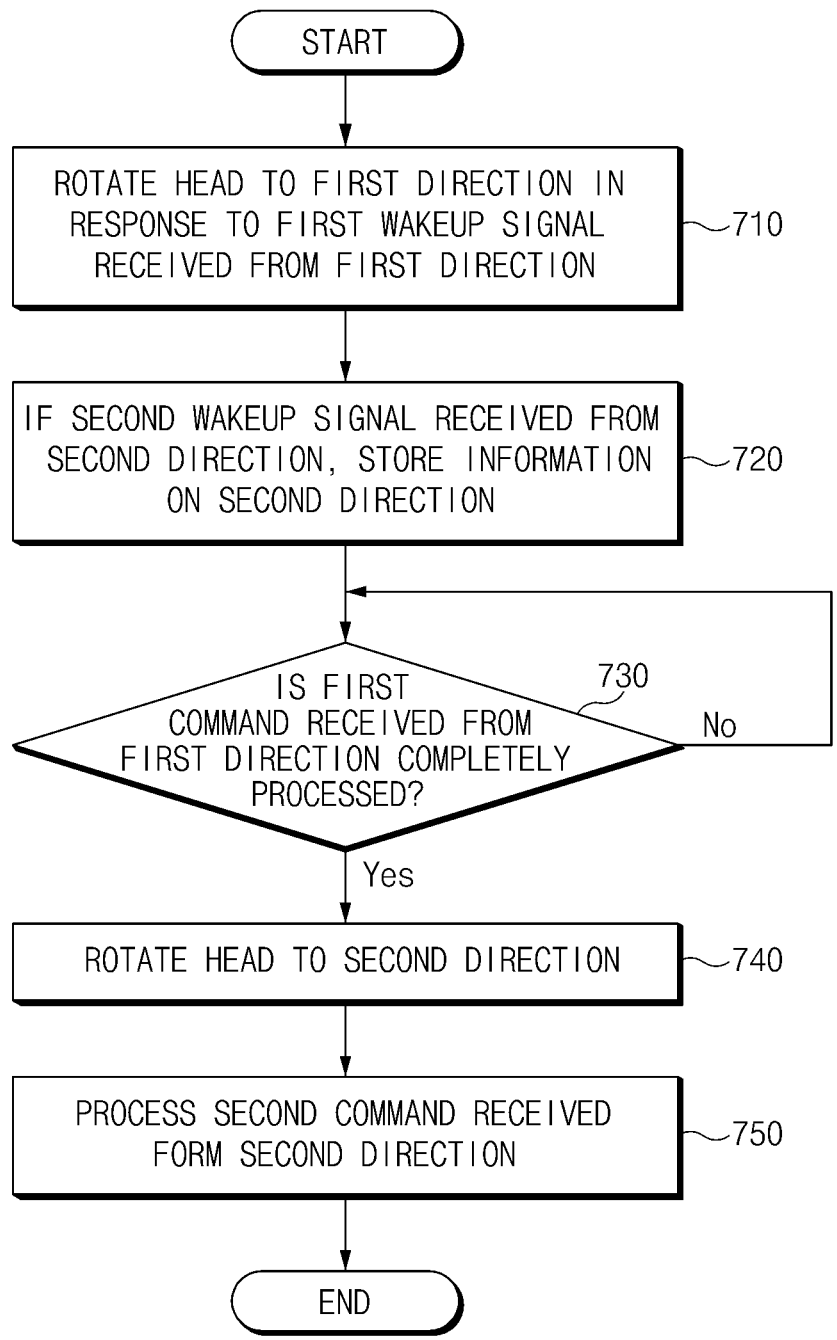
FIG. 7 is a flowchart illustrating a method for processing a voice command of an electronic device, according to an embodiment of the present disclosure.

FIG. 7 is a flowchart illustrating a method for processing a voice command of an electronic device, according to an embodiment of the present disclosure.

The flowchart of FIG. 7 may include operations that are processed by the electronic device 100, 200, 300, or 400 of FIGS. 1 to 4. Accordingly, the disclosure regarding the electronic device 100, 200, 300, or 400 of FIGS. 1 to 4 may be applied to the flowchart of FIG. 7 even though they are omitted in the following description.

Referring to FIG. 7, in step 710, the electronic device (for example, the processor 360 or the processor 460) rotates the head to a first direction in response to a first wakeup signal received from the first direction. For example, the electronic device may detect a voice signal generated by a first user located in the first direction. The electronic device may convert the voice signal generated by the first user to text information. The electronic device may determine the voice signal to be a wakeup signal when text information corresponds to a specific text. The electronic device may determine a direction (the first direction) in which the wakeup signal is generated, and may control the head such that the front direction of the head faces the first direction. For example, if the first user says "Wake up" from a direction of 45°, the electronic device may determine whether "Wake up" corresponds to a wakeup signal. If "Wake up" corresponds to a wakeup signal, the electronic device may rotate the head to a direction of 45°.

In step 720, the electronic device (for example, the processor 360 or the processor 460) stores information on a second direction if receiving a second wakeup signal from a second direction. When receiving the first command from the first user after the head is rotated to the first direction, the electronic device may determine the second direction in which the second wakeup signal is generated if receiving the second wakeup signal from the second direction and may store information on the second direction. In this case, a microphone that receives the first command and a microphone that receives the second wakeup signal may be different. For example, if the second user says "Hello" from a direction of 90° while the electronic device converses with the first user, the electronic device may determine whether "Hello" corresponds to a wakeup signal. If "Hello" corresponds to a wakeup signal, the electronic device may store information on the direction of 90°.

In step 730, the electronic device determines whether the first command received from the first direction has been completely processed. For example, if receiving a stop command from the first direction or not receiving a command from the first direction for a specific time period, the electronic device may determine that the first command has been completely processed. The electronic device may perform step 740 after waiting until the first command is completely processed.

If the first command is completely processed, in step 740, the electronic device may rotate the head to the second direction. The electronic device may control the head based on the stored information on the second direction. For example, the electronic device may rotate the head by 90° based on the information on the direction of 90°.

In step 750, the electronic device processes the second command received from the second direction. After the head rotates to the second direction, the electronic device may receive a voice signal from the second direction. The electronic device may recognize the second command by performing a voice recognition for the received voice signal. The electronic device may execute a function in response to the second command. For example, when receiving a voice signal of "Alarm 8 a.m." from the second user located in the second direction, the electronic device may set an alarm for 8 a.m.

Figure 8:
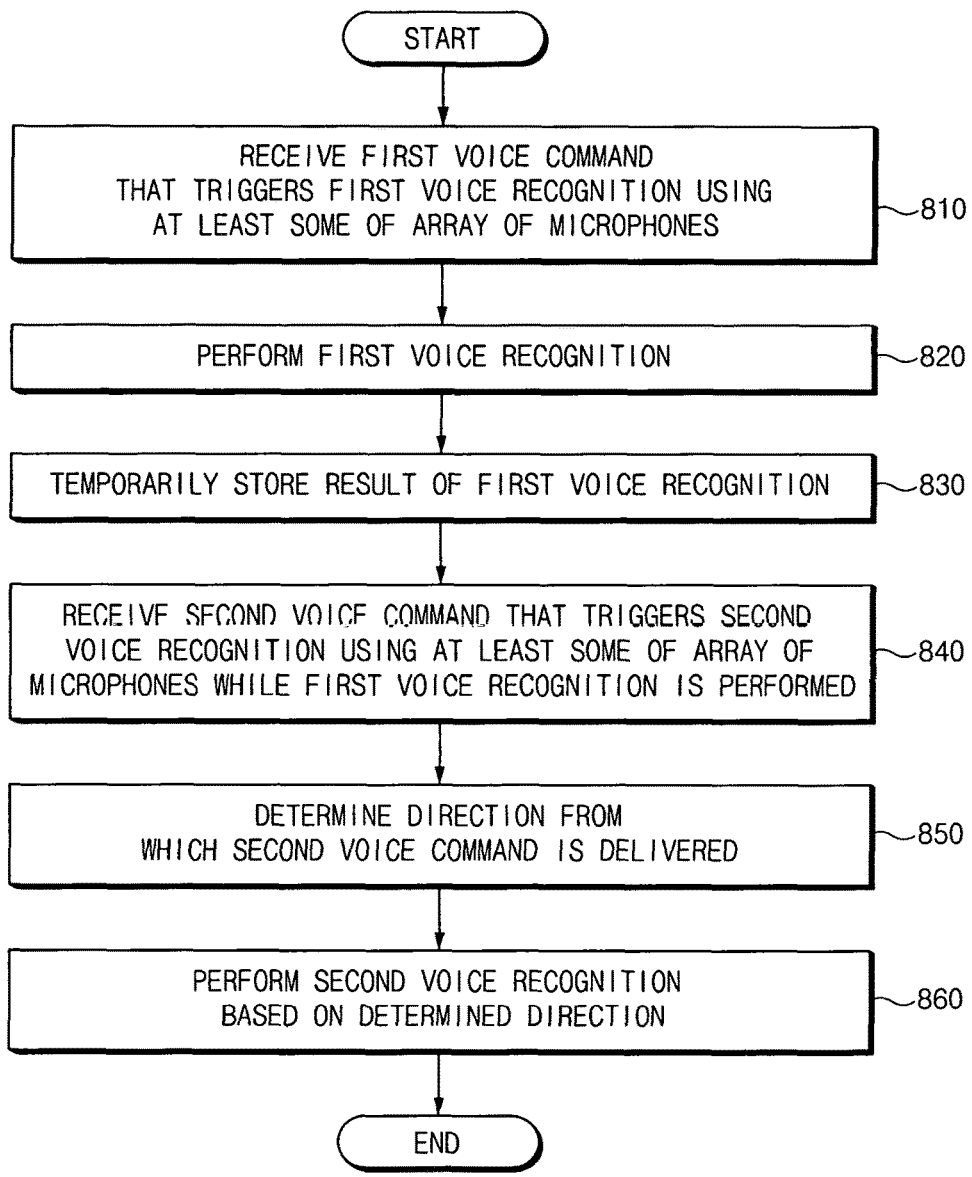
FIG. 8 is a flowchart illustrating a method for processing a voice command of an electronic device, according to another embodiment of the present disclosure.

FIG. 8 is a flowchart illustrating a method for processing a voice command of an electronic device, according to another embodiment of the present disclosure.

The flowchart of FIG. 8 may include operations that are processed by the electronic device 100, 200, 300, or 400 of FIGS. 1 to 4. Accordingly, the disclosure regarding the electronic device 100, 200, 300, or 400 of FIGS. 1 to 4 may be applied to the flowchart of FIG. 8 even though they are omitted in the following description.

Referring to FIG. 8, in step 810, the electronic device receives a first voice command (or a first wakeup signal) that triggers a first voice recognition by using at least some of the array of microphones.

In step 820, the electronic device processes the first voice recognition. The electronic device may receive a voice signal, which is generated in a direction from which the first voice command is received, in response to the first voice command. The electronic device may perform a voice recognition for the received voice signal.

In step 830, the electronic device temporarily store the result of the first voice recognition. For example, the electronic device may store text information as the result of the first voice recognition after converting the voice signal to text information. The electronic device may execute a function corresponding to the result of the first voice recognition after storing the result of the first recognition.

In step 840, the electronic receives a second voice command that triggers a second voice recognition by using at least some of the array of microphones while performing the first voice recognition.

In step 850, the electronic device determines a direction from which the second voice command is delivered. When receiving the second voice command by using two or more microphones, the electronic device may determine a direction from which the second voice command is delivered, based on a time at which the second voice command is received by two or more microphones or a waveform of the second voice command received from two or more microphones.

In step 860, the electronic device processes the second voice recognition by using the determined direction. The electronic device may receive a sound signal generated from the determined direction after the first voice recognition is completed. The electronic device may amplify the voice signal generated from the determined direction. The electronic device may perform a voice recognition for the received voice signal. The electronic device may execute a function corresponding to the result of the second voice recognition.

Figure 9:
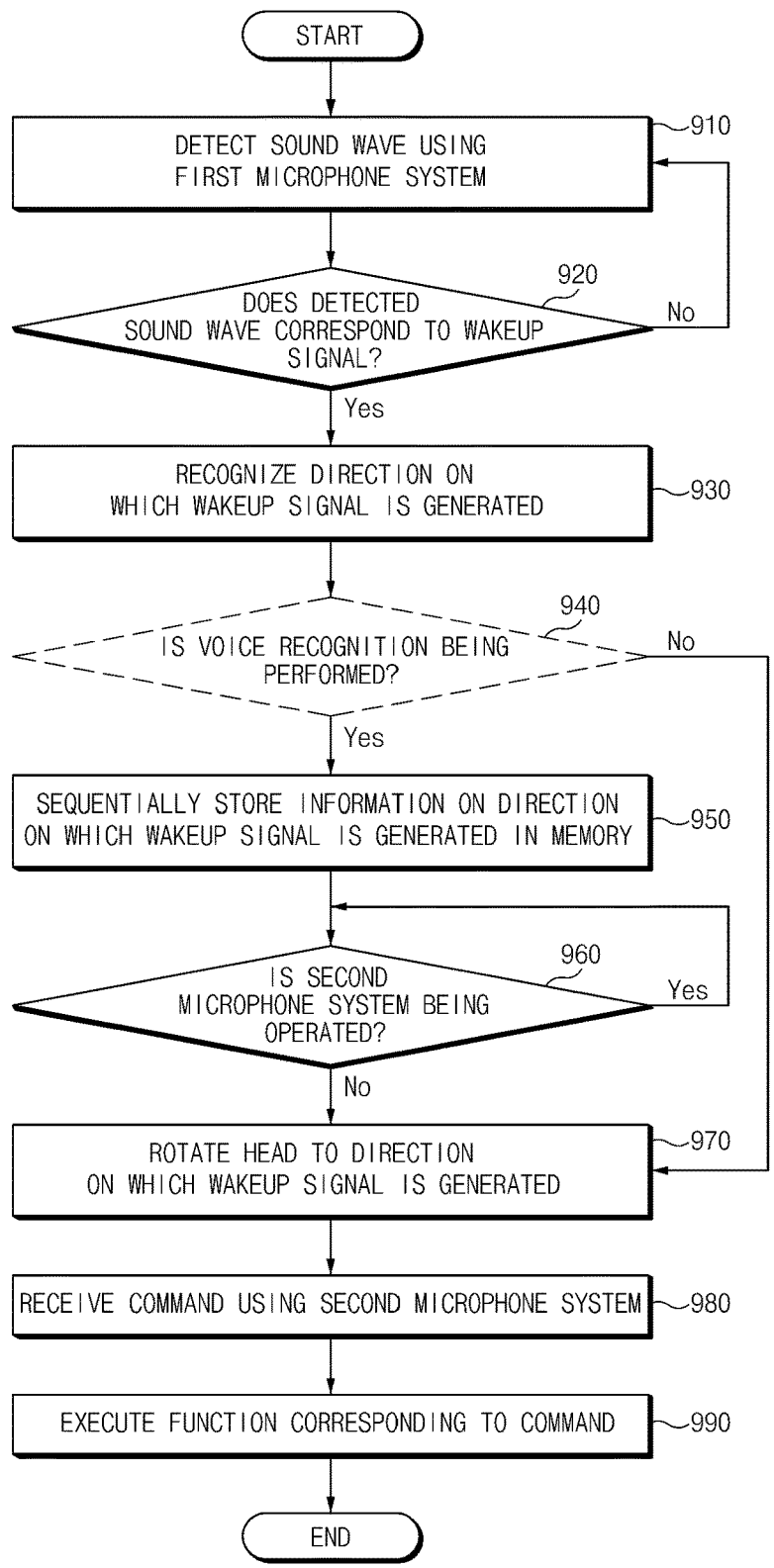
FIG. 9 is a flowchart illustrating a method for processing a voice command of an electronic device, according to another embodiment of the present disclosure.

FIG. 9 is a flowchart illustrating a method for processing a voice command of an electronic device, according to another embodiment of the present disclosure. The operations described with reference to FIGS. 7 and 8 will not be repeatedly described.

The flowchart of FIG. 9 may include operations that are processed by the electronic device 100, 200, 300, or 400 of FIGS. 1 to 4. Accordingly, the disclosure regarding the electronic device 100, 200, 300, or 400 of FIGS. 1 to 4 may be applied to the flowchart of FIG. 9 even though they are omitted in the following description.

Referring to FIG. 9, in step 910, the electronic device detects a sound wave by using a first microphone system. The first microphone system, for example, may be a microphone system that includes a plurality of microphones arranged in a body of the electronic device. The first microphone system may be a microphone system that includes the remaining microphones, except for the microphones provided in a second microphone system, of the plurality of microphones provided in the electronic device. The microphones provided in the first microphone system may be changed based on a time point at which a sound wave is detected.

In step 920, the electronic device determines whether the detected sound wave is a wakeup signal.

In step 930, the electronic device recognizes a direction in which the wakeup signal is generated.

In step 940, the electronic device determines whether a voice recognition is performed. For example, the electronic device may determine whether a voice recognition for the voice signal received from another user is performed. The electronic device may determine whether the command received from the second user is being processed. The electronic device may determine whether it is waiting for reception of a command of the second user. When the electronic device performs a voice recognition or processing of a command or waits for the second user, the electronic device performs steps 950 and 960. If not performing an operation for the second user, the electronic device performs step 970 without performing steps 950 and 960.

In step 950, the electronic device sequentially stores information on the direction of the generated command in a memory.

In step 960, the electronic device determines whether the second microphone system is being operated. The electronic device may receive a command by using a second microphone system. When a plurality of users use the electronic device, the electronic device may receive a wakeup signal from the second user while the first user uses the electronic device. In this case, the electronic device may receive a command from the first user by using the second microphone system, and may receive a wakeup signal from the second user by using the first microphone system. The electronic device may determine whether a command is received from another user, by identifying an operation of the second microphone system. The electronic device may wait until the operation of the second microphone system ends. The electronic device performs step 960 if the operation of the second microphone system ends.

In step 970, the electronic device rotates the head based on information on the direction of the generated command.

In step 980, the electronic device receives a command by using the second microphone system. The second microphone system, for example, may include a plurality of microphones arranged in a front direction of the head of the electronic device. As another example, the second microphone system may include microphones, which are arranged in the direction of the generated command, of the plurality of microphones provided in the electronic device. The microphones provided in the second microphone system may be changed based on a direction from which the command is received.

In step 990, the electronic device processes a function corresponding to the command.

An electronic robot device, according to an embodiment of the present disclosure, includes a body, a rotatable head physically connected with the body, a plurality of microphones arranged in the body or the head, a processor electrically connected with the plurality of microphones and configured to control rotation of the head, and a memory electrically connected with the processor, and the processor is configured to control the head to face a first direction in response to a first wakeup signal received from the first direction, if a second wakeup signal is received from a second direction while the first command received from the first direction is processed, store information on the second direction in the memory, if the first command is completely processed, control the head to face the second direction, and process the second command received from the second direction.

According to another embodiment of the present disclosure, the processor is configured to detect a sound wave by using at least some of the plurality of microphones, determine whether the sound wave corresponds to a wakeup signal, and, if the sound wave corresponds to the wakeup signal, obtain information on a direction of the wakeup signal based on at least one of a detection time or a waveform of the wakeup signal.

According to another embodiment of the present disclosure, the processor is configured to, while the first command is processed, receive the first command by using one or more microphones, which are selected based on the information on the first direction, of the plurality of microphones.

According to another embodiment of the present disclosure, the processor is configured to, while the second command is processed, receive the second command by using one or more microphones, which are selected based on the information on the second direction, of the plurality of microphones.

According to another embodiment of the present disclosure, the processor is configured to, while the first command is processed, amplify a signal received from the first direction by using two or more of the plurality of microphones.

According to another embodiment of the present disclosure, the processor is configured to, while the second command is processed, amplify a signal received from the second direction by using two or more of the plurality of microphones.

According to another embodiment of the present disclosure, some of the plurality of microphones are arranged in the body, the remaining ones of the plurality of microphones are arranged in the head, and the processor is configured to detect a wakeup signal by using the microphones arranged in the body, while the first command is processed, control rotation of the head such that the microphones arranged in the head face the first direction, and while the second command is processed, control rotation of the head such that the microphones arranged in the head face the second direction.

According to another embodiment of the present disclosure, the microphones arranged in the head are directional microphones.

According to another embodiment of the present disclosure, the processor is configured to, if a stop command is received from the first direction or a command is not received from the first direction for a specific time period, control the head to face the second direction and process the second command received from the second direction.

According to another embodiment of the present disclosure, the processor is configured to store information on the second direction in the memory in a first-in/first-out (FIFO) scheme.

According to another embodiment of the present disclosure, the processor is configured to if a third wakeup signal is received from a third direction while the first command is processed after the information on the second direction is stored in the memory, store information on the third direction in the memory, if the first command is completely processed, control the head to face the second direction and process the second command received from the second direction, and if the second command is completely processed, control the head to face the third direction and process the third command received from the third direction.

According to another embodiment of the present disclosure, the processor is configured to store information on a speaker of the second wakeup signal in the memory, together with the information on the second direction, if a third wakeup signal is received from a third direction while processing the first command after the information on the second direction is stored in the memory, store information on a speaker of the third wakeup signal in the memory, together with information on the third direction, if the first command is completely processed when a priority of the speaker of the third wakeup signal is higher than a priority of a speaker of the second wakeup signal, control the head to face the third direction and process a third command received from the third direction, and if the third command is completely processed, control the head to face the second direction and process the second command received from the second direction.

According to another embodiment of the present disclosure, the processor is configured to, if the second command is received while the first command is processed and the second command is a specific command that is immediately processed, process the second command before the first command is completely processed.

According to another embodiment of the present disclosure, the electronic robot device includes a display unit arranged to surround a side wall of the body and exposed through the side wall of the body, and the processor is configured to, if the second wakeup signal or the second command is received while the first command is processed, output an indication of a state of progress of the second wakeup signal or the second command to the second direction by using the display unit.

An electronic device according to an embodiment of the present disclosure, includes a housing, an array of microphones exposed through at least a portion of the housing and arranged and configured to receive sounds from different directions, a speaker exposed through the housing, a volatile memory, a processor located within the housing, and electrically connected with the array of microphones, the speaker, and the volatile memory, and a nonvolatile memory electrically connected with the processor, and the nonvolatile memory stores instructions that, when executed, causes the processor to receive a first command that triggers a first voice recognition by using at least some of the array of microphones, perform at least a portion of the first voice recognition, store a result of the first voice recognition in the volatile memory, while performing the at least a portion of the first voice recognition, receive a second voice command that triggers a second voice recognition by using the at least some of the array of microphones, determine a direction from which the second voice command is delivered, and perform at least a portion of the second voice recognition by using the determined direction.

According to an embodiment of the present disclosure, the instructions, which cause the processor to determine the direction from which the second voice command is delivered, cause the processor to determine the direction from which the second voice command is delivered, based on at least one of a detection time or a waveform of the second voice command.

According to an embodiment of the present disclosure, the instructions, which cause the processor to perform the at least a portion of the second voice recognition, cause the processor to perform at least a portion of the second voice recognition by using some microphones, which are arranged in the determined direction, of the array of microphones.

According to an embodiment of the present disclosure, the instructions, which cause the processor to perform the at least a portion of the second voice recognition, cause the processor to, if completely performing the first voice recognition, perform at least a portion of the second voice recognition.

According to an embodiment of the present disclosure, the electronic device includes a display unit arranged to surround a side wall of the housing and exposed through the side wall of the body, and the nonvolatile memory further includes instructions that, when executed, cause the processor to if receiving the second voice command while performing the at least a portion of the first voice recognition, output an indication that indicates a state of progress of the second voice command to the determined direction by using the display unit.

A voice command processing method of an electronic robot device that includes a body and a rotatable head physically connected with the body includes an operation of controlling the head to face a first direction in response to a first wakeup signal received from the first direction, an operation of, if a second wakeup signal is received from a second direction while a first command received from the first direction is processed, storing information on the second direction, an operation of, if the first command is completely processed, controlling the head to face the second direction, and an operation of processing a second command received from the second direction.

Figure 10:
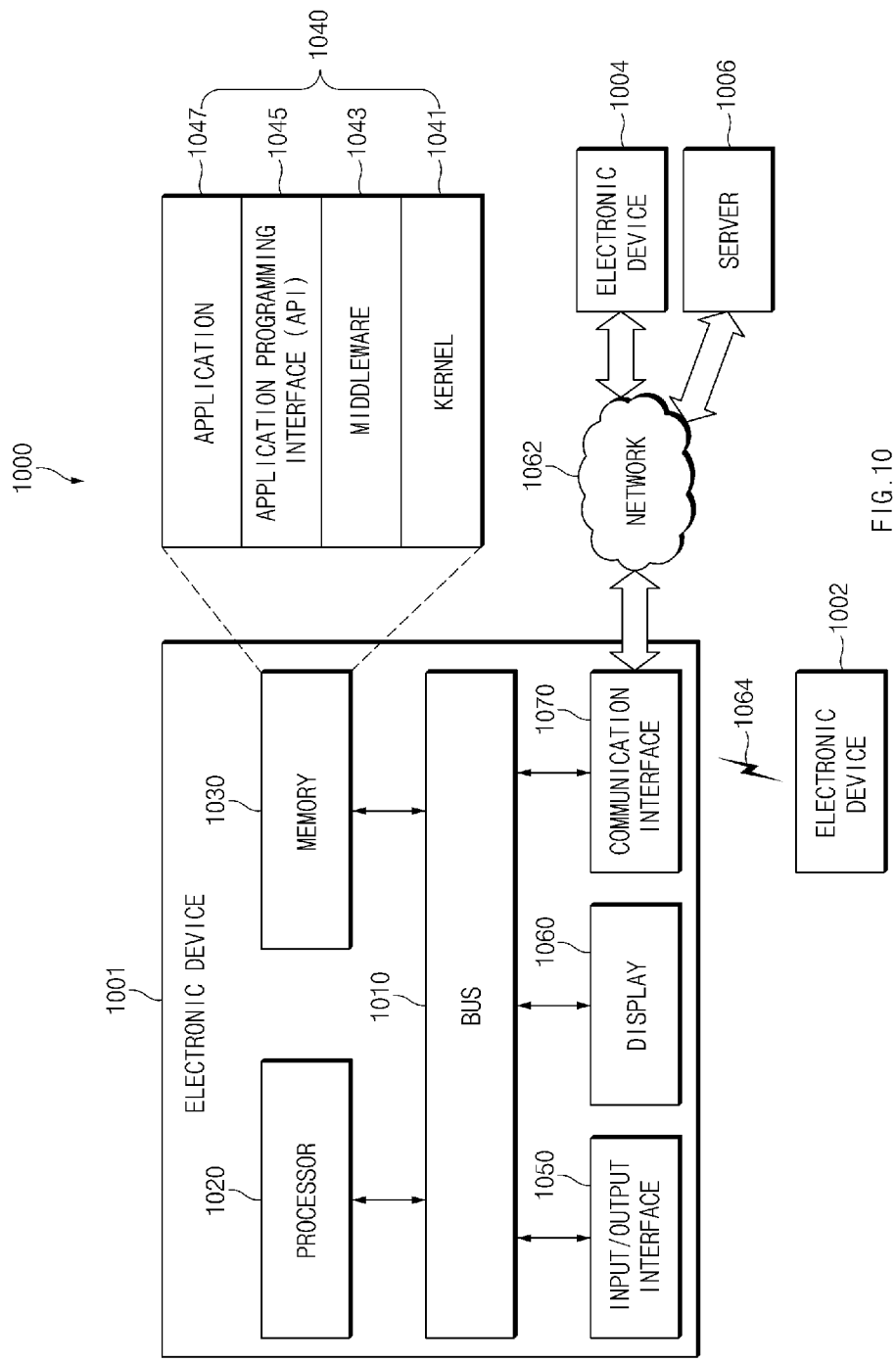
FIG. 10 illustrates an electronic device in a network environment, according to an embodiment of the present disclosure.

FIG. 10 illustrates an electronic device in a network environment, according to an embodiment of the present disclosure.

Referring to FIG. 10, the electronic device 1001, 1002, 1004 or the server 1006 may be connected to each other through a network 1062 or a short range communication 1064. The electronic device 1001 includes a bus 1010, a processor 1020, a memory 1030, an input/output interface 1050, a display 1060, and a communication interface 1070. In some embodiments, the electronic device 1001 may exclude at least one of the elements or may additionally include another element.

The bus 1010 may include, for example, a circuit that connects the components 1010 to 1070 and transfers communications (for example, control messages and/or data) between the components.

The processor 1020 may include one or more of a central processing unit (CPU), an application processor (AP), or a communication processor (CP). The processor 1020, for example, may execute operations or data processing related to the control and/or communication of at least one other component of the electronic device 1001.

The memory 1030 may include a volatile and/or nonvolatile memory. The memory 1030, for example, may store a command or data related to at least one other component of the electronic device 1001. According to an embodiment of the present disclosure, the memory 1030 stores software and/or a program 1040. The program 1040, for example, includes a kernel 1041, middleware 1043, an application programming interface (API) 1045, and/or an application program (or an application) 1047. At least some of the kernel 1041, the middleware 1043, or the API 1045 may be referred to as an operating system (OS).

The kernel 1041, for example, may control or manage system resources (for example, the bus 1010, the processor 1020, and the memory 1030) that are used to execute operations or functions implemented in the other programs (for example, the middleware 1043, the API 1045, or the applications 1047). The kernel 1041 may provide an interface through which the middleware 1043, the API 1045, or the applications 1047 access individual components of the electronic device 1001 to control or manage the system resources.

The middleware 1043, for example, may function as an intermediary that allows the API 1045 or the applications 1047 to communicate with the kernel 1041 to exchange data.

The middleware 1043 may process one or more work requests received from the application programs 1047, according to their priorities. For example, the middleware 1043 may give a priority, by which a system resource (for example, the bus 1010, the processor 1020, or the memory 1030) of the electronic device 1001 may be used, to at least one of the application programs 1047. For example, the middleware 1043 may perform scheduling or load balancing for the one or more work requests by processing the one or more work requests according to the priority given to the at least one of the application programs 1047.

The API 1045 is an interface used, by the application 1047, to control a function provided by the kernel 1041 or the middleware 1043, and may include, for example, at least one interface or function (for example, an instruction), for example, for file control, window control, image processing, and text control.

The input/output interface 1050, for example, may function as an interface that may transfer a command or data that are input from the user or another external device to another element (other elements) of the electronic device 1001. The input/output interface 1050 may output commands or data received from another component(s) of the electronic device 1001 to the user or anther external device.

The display 1060, for example, may include a liquid crystal display (LCD), a light emitting diode (LED) display, an organic light emitting diode (OLED) display, a microelectromechanical system (MEMS) display, or an electronic paper display. The display 1060, for example, may display various content (for example, a text, an image, a video, an icon, and a symbol). The display 1060 may include a touch screen and receive, for example, a touch, a gesture, a proximity, or a hovering input using an electronic pen or the user's body.

The communication interface 1070, for example, may establish communication between the electronic device 1001 and a first external electronic device 1002, a second external electronic device 1004, or a server 1006. For example, the communication interface 1070 may be connected to a network 1062 through a wireless communication or a wired communication to communicate with the second external electronic device 1004 or the server 1006.

The wireless communication is, for example, a cellular communication protocol, and, for example, may use at least one of long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Furthermore, the wireless communication, for example, may include a short range communication 1064. The short range communication 1064 may include at least one of wireless fidelity (Wi-Fi), Bluetooth, near field communication (NFC), magnetic stripe transmission (MST), or GNSS.

An MST may generate a pulse according to transmission data by using an electromagnetic signal, and the pulse may generate a magnetic field signal. The electronic device 1001 may transmit the magnetic field signal to a point of sales (POS) terminal, detect the magnetic field signal by using an MST reader, and restore the data by converting the detected magnetic signal into an electrical signal.

The GNSS may include at least one of, for example, a global positioning system (GPS), a global navigation satellite system (Glonass), a Beidou navigation satellite system (hereinafter, "Beidou"), or the European global satellite-based navigation system (or Galileo), according to an in-use area or a bandwidth. Hereinafter, in the present disclosure, the term "GPS" may be interchangeably used with the term "GNSS". The wired communication may include at least one of, for example, a universal serial bus (USB), a high definition multimedia interface (HDMI), recommended standard (RS) 232 (RS232), and a plain old telephone service (POTS). The network 1062 may include at least one of communication networks, for example, a computer network (for example a LAN or a WAN), the Internet, or a telephone network.

The first and second external electronic devices 1002 and 1004 may be the same or different type of devices from the electronic device 1001. According to an embodiment of the present disclosure, the server 1006 may include a group of one or more servers. All or some of the operations executed by the electronic device 1001 may be executed by the electronic devices 1002 and 1004 or the servers 1006. When the electronic device 1001 executes some functions or services automatically or upon request, it may request at least some functions associated with the functions or services from the electronic devices 1002 and 1004 or the server 1006, in place of or in addition to directly executing the functions or services. The electronic device 1002 or 1004 or the server 1006 may execute a requested function or an additional function, and may transfer the result to the electronic device 1001. The electronic device 1001 may process the received result directly or additionally, and may provide a requested function or service. To this end, for example, the cloud computing, distributed computing, or client-server computing technologies may be used.

Figure 11:
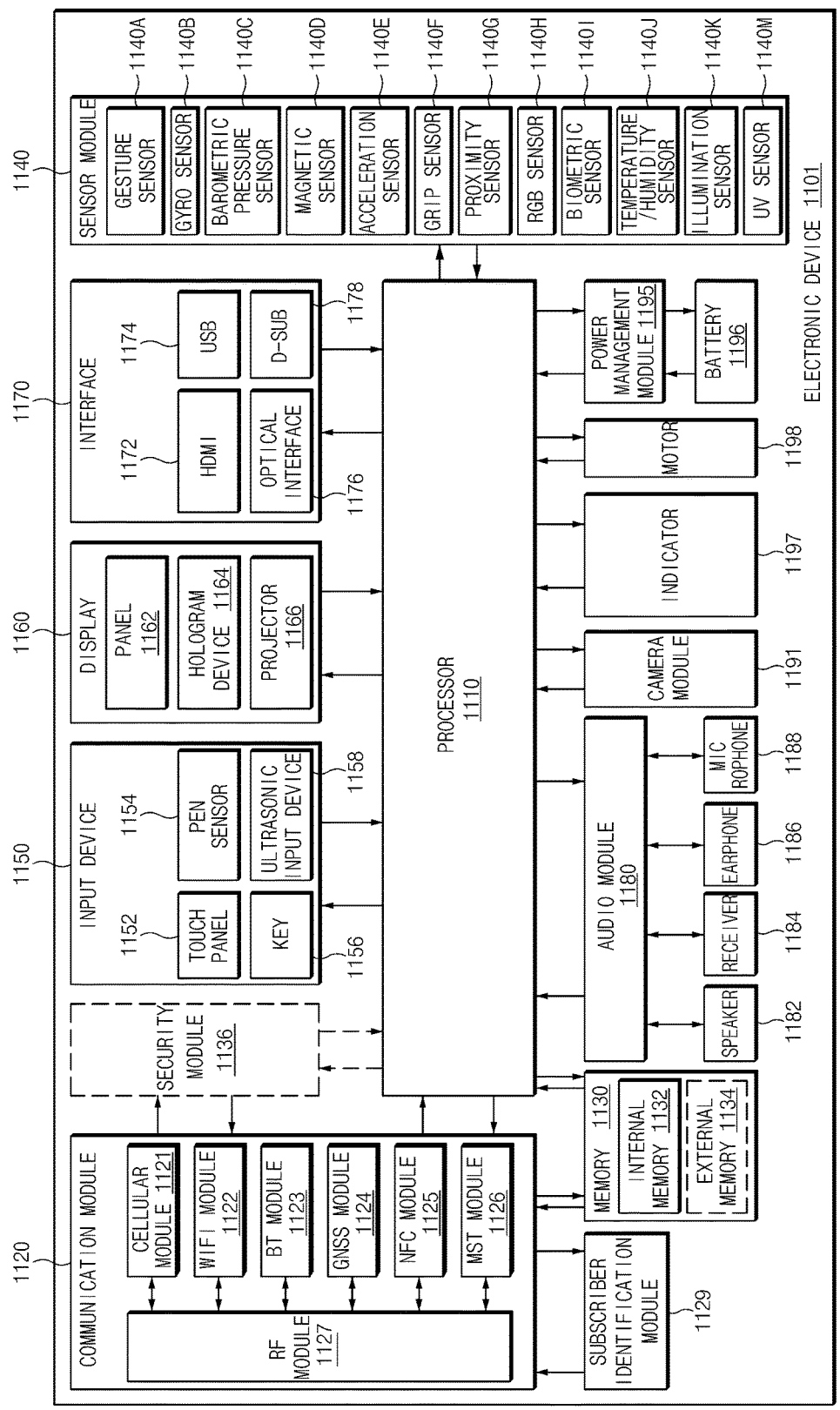
FIG. 11 is a block diagram of an electronic device, according to another embodiment of the present disclosure.

FIG. 11 is a block diagram of an electronic device, according to an embodiment of the present disclosure.

Referring to FIG. 11, an electronic device 1101 includes, for example, the whole part or a part of the electronic device 1001 illustrated in FIG. 10. The electronic device 1101 may include at least one processor (for example, an application processor (AP) 1110), a communication module 1120, a subscriber identification module (SIM) card 1129, a memory 1130, a sensor module 1140, an input device 1150, a display 1160, an interface 1170, an audio module 1180, a camera module 1191, a power management module 1195, a battery 1196, an indicator 1197, or a motor 1198.

The processor 1110 may control a plurality of hardware or software components connected to the processor 1110 by driving an operating system or an application program and perform a variety of data processing and calculations. The processor 1110 may be implemented by, for example, a system on chip (SoC). According to an embodiment of the present disclosure, the processor 1110 may further include a graphical processing unit (GPU) and/or an image signal processor. The processor 1110 may include at least some (for example, a cellular module 1121) of the components illustrated in FIG. 11. The processor 1110 may load instructions or data, received from at least one other component (for example, a non-volatile memory), in a volatile memory to process the loaded instructions or data, and may store various types of data in a non-volatile memory.

The communication module 1120 may have the same or similar structure to the communication interface 1070 of FIG. 10. The communication module 1120 may include, for example, a cellular module 1121, a Wi-Fi module 1122, a Bluetooth module 1123, a GNSS module 1124 (for example, a GPS module, a Glonass module, a Beidou module, or a Galileo module), an NFC module 1125, an MST module 1126, and a radio frequency (RF) module 1127.

The cellular module 1121 may provide a voice call, a video call, a text message service, or an Internet service through, for example, a communication network. According to an embodiment of the present disclosure, the cellular module 1121 may distinguish between and authenticate electronic devices 1101 within a communication network using a subscriber identification module (SIM) card 1129. The cellular module 1121 may perform at least some of the functions that the processor 1110 may provide. The cellular module 1121 may include a communication processor (CP).

Each of the Wi-Fi module 1122, the Bluetooth module 1123, the GNSS module 1124, the NFC module 1125, or the MST module 1126, for example, may include a processor for processing data transmitted/received through the corresponding module. At least some (for example, two or more) of the cellular module 1121, the Wi-Fi module 1122, the Bluetooth module 1123, the GNSS module 1124, the NFC module 1125, and the MST module 1126 may be included in one integrated chip (IC) or IC package.

The RF module 1127 may transmit/receive, for example, a communication signal (for example, an RF signal). The RF module 1127 may include, for example, a transceiver, a power amp module (PAM), a frequency filter, a low noise amplifier (LNA), or an antenna. According to an embodiment of the present disclosure, at least one of the cellular module 1121, the Wi-Fi module 1122, the Bluetooth module 1123, the GNSS module 1124, the NFC module 1125, or the MST module 1126 may transmit and receive an RF signal through a separate RF module.

The SIM 1129 may include, for example, a card including a subscriber identification module and/or an embedded SIM, and may further include unique identification information (for example, an integrated circuit card identifier (ICCID)) or subscriber information (for example, international mobile subscriber identity (IMSI)).

The memory 1130 (for example, the memory 1030) includes, for example, an internal memory 1132 or an external memory 1134. The internal memory 1132 may include at least one of, for example, a volatile memory (for example, a dynamic random access memory (DRAM), a static RAM (SRAM), a synchronous dynamic RAM (SDRAM), and the like) and a non-volatile memory (for example, a one-time programmable read only memory (OTPROM), a programmable ROM (PROM), an erasable and programmable ROM (EPROM), an electrically erasable and programmable ROM (EEPROM), a flash memory (for example, a NAND flash memory or a NOR flash memory), a hard driver, or a solid state drive (SSD).

The external memory 1134 may further include a flash drive, for example, a compact flash (CF), a secure digital (SD), a micro secure digital (Micro-SD), a mini secure digital (Mini-SD), an extreme digital (xD), a memory stick, and the like. The external memory 1134 may be functionally and/or physically connected to the electronic device 1101 through various interfaces.

The security module 1136 is a module including a storage space having a relatively high security level as compared with the memory 1130, and may be a circuit that guarantees safe data storage and a protected execution environment. The security module 1136 may be implemented by a separate circuit, and may include a separate processor. The security module 1136, for example, may be present in a detachable smart chip or a secure digital (SD) card, or may include an embedded secure element (eSE) embedded in a fixed chip of the electronic device 1101. Further, the security module 1136 may be driven by an operation system (OS) that is different from the operating system of the electronic device 1101. For example, the security module 1136 may be operated based on a java card open platform (JCOP) operating system.

The sensor module 1140, for example, may measure a physical quantity or detect an operational state of the electronic device 1101, and may convert the measured or detected information to an electrical signal. The sensor module 1140 includes, for example, at least one of a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a color sensor 1140H (for example, a RGB sensor), a biometric sensor 1140I, a temperature/humidity sensor 1140J, an illumination sensor 1140K, and an ultraviolet (UV) sensor 1140M. Additionally or alternatively, the sensor module 1140 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1140 may further include a control circuit for controlling one or more sensors included therein. In some embodiments, the electronic device 1101 may further include a processor configured to control the sensor module 1140 as a part of or separately from the processor 1110, and may control the sensor module 1140 while the processor 1110 is in a sleep state.

The input device 1150 includes, for example, a touch panel 1152, a (digital) pen sensor 1154, a key 1156, or an ultrasonic input device 1158. The touch panel 1152 may use at least one of, for example, a capacitive type, a resistive type, an infrared type, and an ultrasonic type. The touch panel 1152 may further include a control circuit. The touch panel 1152 may further include a tactile layer, and provide a tactile reaction to a user.

The (digital) pen sensor 1154 may include, for example, a recognition sheet which is a part of the touch panel or a separate recognition sheet. The key 1156 may include, for example, a physical button, an optical key, or a keypad. The ultrasonic input device 1158 may detect ultrasonic waves generated by an input tool through a microphone 1188 and may identify data corresponding to the detected ultrasonic waves.

The display 1160 (for example, the display 1060) includes a panel 1162, a hologram device 1164, or a projector 1166. The panel 1162 may include a component equal or similar to the display 1060 of FIG. 10. The panel 1162 may be, for example, flexible, transparent, or wearable. The panel 1162 may be formed as a single module together with the touch panel 1152. The hologram device 1164 may show a three dimensional image in the air using an interference of light. The projector 1166 may display an image by projecting light onto a screen. The screen may be located, for example, in the interior of or on the exterior of the electronic device 1101. According to an embodiment of the present disclosure, the display 1160 may further include a control circuit for controlling the panel 1162, the hologram device 1164, or the projector 1166.

The interface 1170 includes, for example, a high-definition multimedia interface (HDMI) 1172, a universal serial bus (USB) 1174, an optical interface 1176, or a D-subminiature (D-sub) 1178. The interface 1170 may be included in, for example, the communication interface 1070 illustrated in FIG. 10. Additionally or alternatively, the interface 1170 may include, for example, a mobile high-definition link (MI-IL) interface, a secure digital (SD) card/multimedia card (MMC) interface, or an infrared data association (IrDA) standard interface.

The audio module 1180 may bilaterally convert, for example, a sound and an electrical signal. At least some elements of the audio module 1180 may be included in, for example, the input/output interface 1050 illustrated in FIG. 10. The audio module 1180 may process sound information input or output through, for example, a speaker 1182, a receiver 1184, earphones 1186, the microphone 1188, and the like.

The camera module 1191 is a device which may photograph a still image and a dynamic image. According to an embodiment of the present disclosure, the camera module 1191 may include one or more image sensors (for example, a front sensor or a back sensor), a lens, an image signal processor (ISP) or a flash (for example, an LED or xenon lamp).

The power management module 1195 may manage, for example, power of the electronic device 1101. According to an embodiment of the present disclosure, the power management module 1195 may include a power management integrated circuit (PMIC), a charger integrated circuit (IC), or a battery gauge. The PMIC may have a wired and/or wireless charging scheme. Examples of the wireless charging method may include, for example, a magnetic resonance method, a magnetic induction method, an electromagnetic method, and the like. Additional circuits (for example, a coil loop, a resonance circuit, a rectifier, etc.) for wireless charging may be further included. The battery gauge may measure, for example, a residual charge quantity of the battery 1196, and a voltage, a current, or a temperature while charging. The battery 1196 may include, for example, a rechargeable battery and/or a solar battery.

The indicator 1197 may indicate particular status of the electronic device 1101 or a part thereof (for example, the processor 1110), for example, a booting status, a message status, a charging status, and the like. The motor 1198 may convert an electrical signal into mechanical vibrations, and may generate a vibration or haptic effect. The electronic device 1101 may include a processing device (for example, a GPU) for supporting mobile TV. The processing unit for supporting mobile TV may process, for example, media data pursuant to a certain standard of digital multimedia broadcasting (DMB), digital video broadcasting (DVB), or MediaFlo™.

Each of the elements described in the specification may include one or more components, and the terms of the elements may be changed according to the type of the electronic device. The electronic device may include at least one of the elements described in the specification, and some elements may be omitted or additional elements may be further included. Some of the elements of the electronic device according to an embodiment of the present disclosure may be coupled to form one entity, and may perform the same functions of the corresponding elements before they are coupled.

Figure 12:
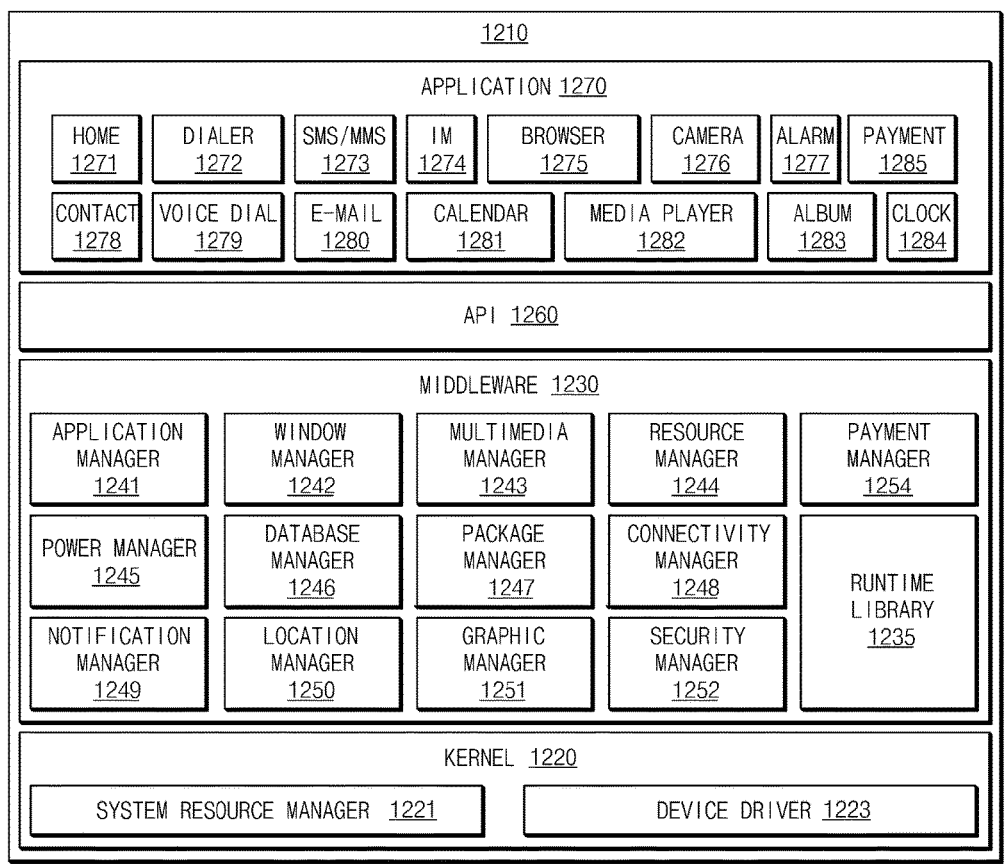
FIG. 12 illustrates a block diagram of a program module, according to an embodiment of the present disclosure.

FIG. 12 illustrates a block diagram of a program module, according to an embodiment of the present disclosure.

According to an embodiment of the present disclosure, the program module 1210 (for example, a program 1040) may include an operating system (OS) that controls resources related to the electronic device 1001, and various application programs (for example, an application program 1047) that are driven on an operating system. The operating system may be, for example, Android™, iOS™, Windows™, Symbian™, Tizen™, Bada™, and the like.

The program module 1210 includes a kernel 1220, a middleware 1230, an API 1260, or applications 1270. At least a part of the program module 1210 may be preloaded on an electronic device or may be downloaded from external electronic devices 1002 and 1004 and a server 1006.

The kernel 1220 (for example, the kernel 1041) includes, for example, a system resource manager 1221, or a device driver 1223. The system resource manager 1221 may control, allocate, or retrieve the system resources. According to an embodiment of the present disclosure, the system resource manager 1221 may include a process management unit, a memory management unit, or a file system management unit. The device driver 1223 may include, for example, a display driver, a camera driver, a Bluetooth driver, a shared-memory driver, a USB driver, a keypad driver, a Wi-Fi driver, an audio driver, or an inter-process communication (IPC) driver.

The middleware 1230 may provide a function required by the applications 1270 in common or provide various functions to the applications 1270 through the API 1260 so that the applications 1270 may efficiently use limited system resources of the electronic device. According to an embodiment of the present disclosure, the middleware 1230 (for example, the middleware 1043) includes, for example, at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, a security manager 1252, and a payment manager 1254.

The run time library 1235 may include, for example, a library module that a compiler uses in order to add new functions through a programming language while the applications 1270 are executed. The run time library 1235 may perform input/output management, memory management, or a function for an arithmetic function.

The application manager 1241, for example, may manage a lifecycle of at least one of the applications 1270. The window manager 1242 may manage a GUI resource used in a screen. The multimedia manager 1243 may detect a format required for reproducing various media files and encode or decode a media file using a codec appropriate for the corresponding format. The resource manager 1244 may manage resources, such as a source code, a memory, or a storage space, of at least one of the applications 1270.

The power manager 1245 may operate together with, for example, a basic input/output system (BIOS), so as to manage a battery or power and may provide power information required for the operation of the electronic device. The database manager 1246 may generate, search for, or change a database to be used by at least one of the applications 1270. The package manager 1247 may manage the installation or the updating of applications distributed in a package file form.

For example, the connectivity manager 1248 may manage wireless connections, such as Wi-Fi or Bluetooth. The notification manager 1249 may display or notify an event such as a received message, an appointment, a proximity notification, and the like to a user without disturbance. The location manager 1250 may manage location information of the electronic device. The graphic manager 1251 may manage graphic effects to be provided to a user and user interfaces related to the graphic effects. The security manager 1252 may provide various security functions required for system security or user authentication. According to an embodiment of the present disclosure, when the electronic device 1001 has a phone function, the middleware 1230 may further include a telephony manager for managing a voice or video communication function of the electronic device.

The middleware 1230 may include a middleware module for forming a combination of various functions of the aforementioned components. The middleware 1230 may provide modules specialized according to the type of OS in order to provide differentiated functions. In addition, some existing components may be dynamically removed from the middleware 1230, or new components may be added to the middleware 230.

The API 1260 (for example, the API 1045) is, for example, a set of API programming functions, and may be provided another configuration according to an operating system. For example, for each platform, one API set may be provided in a case of Android™ or iOS™, and two or more API sets may be provided in a case of Tizen™.

The application 1270 (for example, the application program 1047) includes, for example, a home 1271, a dialer 1272, an SMS/MMS 1273, an instant message (IM) 1274, a browser 1275, a camera 1276, an alarm 1277, a contact 1278, a sound dial 1279, an e-mail 1280, a calendar 1281, a media player 1282, an album 1283, a clock 1284, payment 1285 or at least one application that may provide health care (for example, measuring an exercise degree or blood glucose level) or environmental information.

According to an embodiment of the present disclosure, the application 1270 may include an information exchange application that supports exchange of information between the electronic device 1001 and the external electronic device 1002 and 1004. The application associated with information exchange may include, for example, a notification relay application for forwarding specific information to an external electronic device, or a device management application for managing an external electronic device.

For example, the notification relay application may have a function of forwarding, to electronic devices 1002 and 1004, notification information generated from other applications of the electronic device 1001 (for example, an SMS/MMS application, an e-mail application, a health care application, and an environmental information application). The notification relay application may receive notification information from, for example, an external electronic device and provide the received notification information to a user.

The device management application may, for example, manage (for example, install, delete, or update) a function for at least a part of the electronic device 1002 or 1004 communicating with the electronic device 1001 (for example, activating/deactivating the external electronic device itself (or some components thereof) or adjusting the brightness (or resolution) of a display), an application operating in the external electronic device, or a service provided from the external electronic device (for example, a telephone call service or a message service).

According to an embodiment of the present disclosure, the application 1270 may include an application (for example, a health management application) designated according to an attribute of electronic device 1002 or 1004. The application 1270 may include an application that is received from the server 1006 or the device 1002 or 1004. The applications 1270 may include a preloaded application or a third party application that is downloaded from a server. The names of the elements of the program module 1210 may vary according to the type of the operating system.

According to an embodiment of the present disclosure, at least a part of the program module 1210 may be implemented by software, firmware, hardware, or two or more combinations thereof. At least a part of the program module 1210, for example, may be implemented (for example, executed) by the processor 1110. At least a part of the program module 1210 may include, for example, a module, a program routine, a set of instructions, or a process for performing at least one function.

The term "module" as used in the specification may mean a unit including, for example, one of hardware, software, or firmware or a combination of the two or more of them. The term module may be used interchangeably with the terms a unit, a logic, a logical block, a component, or a circuit The module may be a minimum unit or a part of an integrally configured part. The module may be a minimum unit or a part which performs one or more functions. The module may be implemented mechanically or electromagnetically. For example, the module may include at least one of an application-specific integrated circuit (ASIC) chip, a field-programmable gate array, or a programmable-logic device, which has been known, will be developed in the future, or performs certain operations.

At least some of the devices (for example, modules or functions) or methods (for example, operations) according to an embodiment of the present disclosure may be implemented by an instruction stored in a computer-readable storage medium, for example, in the form of a program module. When the instruction is executed by the processor (for example, the processor 1020), the at least one processor may perform a function corresponding to the instruction. The computer-readable storage medium may be, for example, a memory 1030.

The computer-readable storage medium may include a hard disk, a floppy disk, a magnetic medium (for example, a magnetic tape), an optical medium (for example, a compact disk read only memory (CD-ROM)), a digital versatile disk (DVD), a magneto-optical medium (for example, a floptical disk), a hardware device (for example, a read only memory (ROM), a random access memory (RAM), or a flash memory)). Further, the program instruction may include high-level language codes which may be executed by a computer using an interpreter as well as machine languages created by using a compiler. The above-mentioned hardware device may be configured to be operated as one or more software module to perform operations of various embodiments, and the converse is applied.

The module or program module, according to an embodiment of the present disclosure, may include at least one of the above-mentioned element, omit some of them, or further include other elements. The module, the program module, or the operations performed by other elements may be performed in a sequential, parallel, iterative, or heuristic method. Further, some operations may be executed in another sequence or may be omitted, or other operations may be added.

The electronic robot device according to an embodiment of the present disclosure may effectively perform responses to a plurality of users by, while responding to a user, sequentially processing commands of other users.

Further, the electronic robot device according, to an embodiment of the present disclosure, may provide responses to the directions, from which voices of a plurality of users are received, in the sequence in which the voices are received, by sequentially storing information on the directions from which the voices are received.

Further, the electronic robot device, according to an embodiment of the present disclosure, may provide an indication by which a user may identify whether a voice has been processed, by outputting a state of progress of the voice in a direction, from which the voice is received from the user, by using a display unit.

In addition, the present disclosure may provide various effects that are directly or indirectly recognized.

Further, the embodiments disclosed in the present specification are provided to describe the technical contents or for understanding of the technical contents, and the technical scope of the present disclosure is not limited thereto. Accordingly, the scope of the present disclosure should be construed to include all changes or various embodiments based on the technical spirit of the present disclosure as defined by the appended claims and their equivalents.

What is claimed is:

1. An electronic robot device comprising:
a body;
a rotatable head physically connected with the body;
a plurality of microphones arranged in the body or the head;
a memory; and
a processor electrically connected with the plurality of microphones and configured to;
control the head to face a first direction in response to a first wakeup signal received from the first direction,
if a second wakeup signal is received from a second direction while a first command received from the first direction is processed, store information on the second direction in the memory,
if the first command is completely processed, control the head to face the second direction, and
process a second command received from the second direction.

2. The electronic robot device of claim 1, wherein the processor is further configured to:
detect a sound wave using at least some of the plurality of microphones,
determine whether the sound wave corresponds to a wakeup signal, and
if the sound wave corresponds to the wakeup signal, obtain information on a direction of the wakeup signal based on at least one of a detection time and a waveform of the wakeup signal.

3. The electronic robot device of claim 1, wherein the processor is further configured to:
receive the first command using one or more microphones, which are selected based on the information on the first direction, of the plurality of microphones.

4. The electronic robot device of claim 3, wherein the processor is further configured to:
while the first command is being processed, amplify a signal received from the first direction using two or more of the plurality of microphones.

5. The electronic robot device of claim 1, wherein the processor is further configured to:
receive the second command using one or more microphones, which are selected based on the information on the second direction, of the plurality of microphones.

6. The electronic robot device of claim 5, wherein the processor is further configured to:
while the second command is being processed, amplify a signal received from the second direction using two or more of the plurality of microphones.

7. The electronic robot device of claim 1, wherein some of the plurality of microphones are arranged in the body and the remaining microphones of the plurality of microphones are arranged in the head, and
wherein the processor is further configured to:
detect a wakeup signal using the microphones arranged in the body,
while the first command is being processed, control rotation of the head such that the microphones arranged in the head face the first direction, and
while the second command is being processed, control rotation of the head such that the microphones arranged in the head face the second direction.

8. The electronic robot device of claim 7, wherein the microphones arranged in the head are directional microphones.

9. The electronic robot device of claim 1, wherein the processor is further configured to:
if a stop command is received from the first direction or a command is not received from the first direction for a specific time period, control the head to face the second direction and process the second command received from the second direction.

10. The electronic robot device of claim 1, wherein the processor is further configured to:
store information on the second direction in the memory using a first-in/first-out (FIFO) scheme.

11. The electronic robot device of claim 1, wherein the processor is further configured to:
if a third wakeup signal is received from a third direction while the first command is being processed after the information on the second direction is stored in the memory, store information on the third direction in the memory,
if the first command is completely processed, control the head to face the second direction and process the second command received from the second direction, and
if the second command is completely processed, control the head to face the third direction and process a third command received from the third direction.

12. The electronic robot device of claim 1, wherein the processor is further configured to:
store information on a user's voice of the second wakeup signal with the information on the second direction in the memory, if a third wakeup signal is received from a third direction while processing the first command after the information on the second direction is stored in the memory, store information on a user's voice of the third wakeup signal with information on the third direction in the memory, if the first command is completely processed when a priority of a user providing the third wakeup signal is higher than a priority of a user providing the second wakeup signal, control the head to face the third direction and process a third command received from the third direction, and if the third command is completely processed, control the head to face the second direction and process the second command received from the second direction.

13. The electronic robot device of claim 1, wherein the processor is further configured to:

if the second command is received while the first command is being processed and the second command is a specific command that is immediately processed, process the second command before the first command is completely processed.

14. The electronic robot device of claim 1, further comprising:

a display unit arranged to surround a side wall of the body and exposed through the side wall of the body, wherein the processor is further configured to:

if the second wakeup signal or the second command is received while the first command is being processed, output an indication of a state of a progress of the second wakeup signal or the second command using the display unit.

15. A voice command processing method of an electronic robot device that comprises a body and a rotatable head physically connected with the body, the method comprising:

controlling the head to face a first direction in response to a first wakeup signal received from the first direction, if a second wakeup signal is received from a second direction while a first command received from the first direction is being processed, storing information on the second direction;

if the first command is completely processed, controlling the head to face the second direction; and processing a second command received from the second direction.

* * * * *